US010031286B1

United States Patent
Li et al.

(10) Patent No.: US 10,031,286 B1
(45) Date of Patent: Jul. 24, 2018

(54) WAVEGUIDE STRUCTURES IN ANISOTROPIC LASING AND NONLINEAR OPTICAL MEDIA

(71) Applicant: Onyx Optics, Inc., Dublin, CA (US)

(72) Inventors: Da Li, San Ramon, CA (US); Helmuth E. Meissner, Pleasanton, CA (US); Stephanie K. Meissner, Clayton, CA (US)

(73) Assignee: ONYX OPTICS, INC., Dublin, CA (US)

( * ) Notice: Subject to any disclaimer, the term of this patent is extended or adjusted under 35 U.S.C. 154(b) by 0 days.

(21) Appl. No.: 15/623,273

(22) Filed: Jun. 14, 2017

Related U.S. Application Data

(60) Provisional application No. 62/350,132, filed on Jun. 14, 2016.

(51) Int. Cl.
*G02B 6/10* (2006.01)
*G02F 1/355* (2006.01)
*H01S 3/063* (2006.01)
*G02F 1/365* (2006.01)
(Continued)

(52) U.S. Cl.
CPC ............ *G02B 6/10* (2013.01); *G02F 1/3551* (2013.01); *G02F 1/365* (2013.01); *H01S 3/0632* (2013.01); *H01S 3/109* (2013.01); *G02B 1/02* (2013.01)

(58) Field of Classification Search
None
See application file for complete search history.

(56) References Cited

U.S. PATENT DOCUMENTS

| 4,791,648 A | 12/1988 | Vojak et al. |
| 4,862,488 A * | 8/1989 | Schiller ............ G01N 23/20025 378/71 |
| 5,259,058 A | 11/1993 | Imoto |

(Continued)

FOREIGN PATENT DOCUMENTS

JP 2014-2198 A * 1/2014

OTHER PUBLICATIONS

D. Russo et al. Wave propagation in anisotropic thin-film optical waveguides. Journal of the Optical Society of America, 63:2:138-145, Feb. 1973.*

(Continued)

*Primary Examiner* — Mike Stahl
(74) *Attorney, Agent, or Firm* — Kilpatrick Townsend & Stockton LLP

(57) ABSTRACT

A laser or nonlinear optical waveguide is presented that is formed from a core anisotropic crystal sandwiched by a cladding of anisotropic crystals of the same material but slightly rotated optical axes. The core and cladding crystals can be cut from the same crystal boule and bonded without adhesives between them. Because the crystals are anisotropic, the core and slightly skewed cladding crystals exhibit different refractive indexes to a propagating light beam. The difference in refractive indexes should be $\geq 1.2 \times 10^{-6}$ for mode confinement and $2d/\lambda \cdot \mathrm{Sqrt}(n_{core}^2 - n_{clad}^2) \leq 1.37$ to achieve single mode operation in a square cross section, $\leq 1$ for a planar cross section. Alternative embodiments use slightly different doping amounts in crystals to achieve the difference in refractive indexes between the core and cladding.

18 Claims, 14 Drawing Sheets

POSITIVE CRYSTAL
$(n_e > n' > n_o)$

(51) Int. Cl.
*H01S 3/109* (2006.01)
*G02B 1/02* (2006.01)

(56) References Cited

U.S. PATENT DOCUMENTS

| | | | |
|---|---|---|---|
| 5,282,260 | A | 1/1994 | Buchal et al. |
| 5,441,803 | A | 8/1995 | Meissner |
| 5,846,638 | A | 12/1998 | Meissner |
| 6,275,636 | B1 | 8/2001 | Liu et al. |
| 6,785,304 | B2 | 8/2004 | Filgas |
| 6,993,212 | B2 | 1/2006 | Block et al. |
| 7,192,480 | B2 | 3/2007 | Burrows |
| 7,715,674 | B2 | 5/2010 | Miyabe et al. |
| 7,803,451 | B2 | 9/2010 | Lee et al. |
| 8,102,593 | B2 | 1/2012 | Mu et al. |
| 8,390,922 | B1 | 3/2013 | Baehr-Jones et al. |
| 8,396,334 | B2 | 3/2013 | Ichikawa |
| 8,660,395 | B2 | 2/2014 | Rochette et al. |
| 9,001,414 | B2 | 4/2015 | Mattsson et al. |
| 2003/0160034 | A1* | 8/2003 | Filgas ............... B23K 26/0648 219/121.68 |

OTHER PUBLICATIONS

D. Marcuse et al. Modes of a symmetric slab optical waveguide in birefringent media, part II: slab with coplanar optical axis. IEEE Journal of Quantum Electronics, QE-15:2:92-101, Feb. 1979.*

Chiang, "Dual effective-index method for the analysis of rectangular dielectric waveguides", Applied Optics, vol. 25, No. 13, Jul. 1, 1986, pp. 2169-2174.

Coldren et al., "Diode lasers and Photonic Integrated Circuits", Appendix Three: Introduction to Optical Waveguiding in Simple Double-Heterostructures, 1995, pp. 428-437.

Coucoulas et al., "Compliant Bonding—A new technique for joining microelectronic components", IEEE Transactions on Electron Devices, vol. 15, No. 9, Sep. 1968, pp. 664-674.

Coucoulas, "Compliant Bonding," Western Electric Company, Inc., IEEE 20$^{th}$ Electronic Components Conference, Electronics Engineering Research Center, Princeton, New Jersey, Proceedings May 1970, 11 pages.

Dawson et al., "Analysis of the scalability of diffraction-limited fiber lasers and amplifiers to high average power", Optics Express, vol. 16, No. 17, 2008, pp. 13240-13266.

Dawson et al., "Power scaling analysis of fiber lasers and amplifiers based on nonsilica materials", Proc. of SPIE, vol. 7686, 2010, pp. 768611 1-12.

Koechner, "Solid-State Laser Engineering", 5th Edition, 1999, pp. 46-53.

Mu et al., "Novel Technology for Producing LiNbO3 Nonlinear Optical Waveguides", Photonics Conference (IPC), IEEE, 2012, 3 pages.

Myatt et al., "Optical Fabrication: Optical contacting grows more robust", http://www.laserfocusworld.com/articles/print/volume-42/issue-1/features/optical-fabrication-optical-contacting-grows-more-robust.htnnl, Jan. 1, 2006, 6 pages.

Traggis et al., "Epoxy Free Bonding for High Performance Lasers", 11th Annual Directed Energy Symposium Proceedings, Directed Energy Professional Society, 2008, 12 pages.

Traggis et al., "Fabrication and Processing Technologies for Thin Disk Laser Elements", Journal of Directed Energy, Directed Energy Professional Society, Document # 20110414, 2011, 16 pages.

Traggis et al., "Improved Bond Strength Characterization of Chemically Activated Direct Bonding (CADB®) Epoxy-Free Bonded Solid State Laser Materials", Proc. SPIE 7578, Feb. 17, 2010, 6 pages.

Traggis et al., "Novel Technique for Producing Oversized Laser Gain Media in High Fluence Applications", SSDLTR 2009 Technical Digest, Directed Energy Professional Society, 2009, pp. 111-115.

* cited by examiner

POSITIVE CRYSTAL
($n_e > n' > n_o$)

NEGATIVE CRYSTAL
($n_o > n' > n_e$)

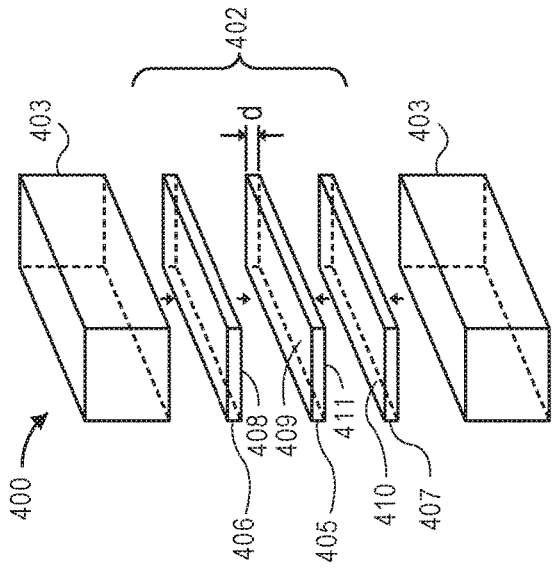
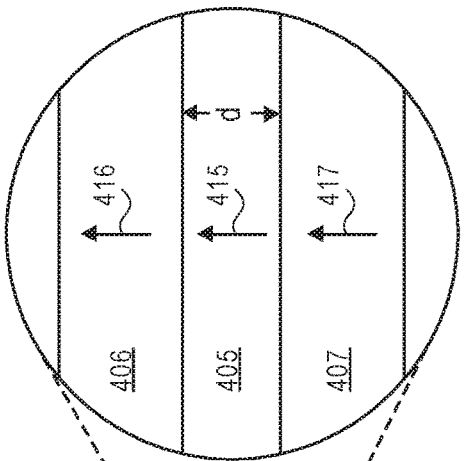
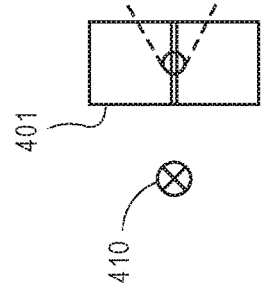
FIG. 4A
FIG. 4B
FIG. 4C

WAVEGUIDE STRUCTURES IN ANISOTROPIC LASING AND NONLINEAR OPTICAL MEDIA

CROSS-REFERENCES TO RELATED APPLICATIONS

This application claims the benefit of U.S. Provisional Application No. 62/350,132, filed Jun. 14, 2016, which is hereby incorporated by reference in its entirety for all purposes.

STATEMENT AS TO RIGHTS TO INVENTIONS MADE UNDER FEDERALLY SPONSORED RESEARCH AND DEVELOPMENT

Not Applicable

BACKGROUND

1. Field of the Invention

The present invention generally relates generally to optical waveguides for use as an active laser medium or for frequency-changing optics and methods of manufacturing the same.

2. Description of the Related Art

The present invention relates generally to optical waveguides, and more particularly to a method of designing and producing intrinsic single-mode waveguides preferably via an adhesive-free bonding technique, for either laser emission/amplification or frequency conversion. Any other technique for joining may be applicable as long as it does not interfere with the performance of the device.

Generally, an optical waveguide includes a core region and a cladding region. The core region usually has higher refractive index than that in cladding region, in order to confine the light in the core as it propagates. Light propagates through the core region by total internal reflection of the light at a boundary between the core and cladding, forming transverse modes in the waveguide. The number of transverse modes is determined by the numerical aperture (NA) of the waveguide, the core size, and the wavelength $\lambda$. Given core size and operational wavelength, NA is a key parameter to determine mode numbers, where the magnitude of its value is mainly decided by the refractive index difference between core and inner cladding (see Eq. (1):

$$NA = \sqrt{n_{core}^2 - n_{clad}^2} \quad (1)$$

The present disclosure is principally concerned with single crystals and optical ceramic polycrystalline waveguide components but also is applicable to waveguides consisting of layers of optical glass.

Single-mode operation is generally preferred in a crystalline waveguide as laser gain medium, or laser amplifier, for its large mode area and tight confinement of electric field. However in some cases of high power and high energy content, multimode operation maybe desirable.

The major power scaling limitations for narrow band lasers can be summarized as laser damage, nonlinear effects, and thermal effects. For pulsed lasers, saturation fluence also needs to be considered.

Yttrium aluminum garnet, $Y_3Al_5O_{12}$, is the most common isotropic crystalline laser medium, but other anisotropic crystals such as Yttrium lithium fluoride, $YLiF_4$, Yttrium Vanadate, $YVO_4$, Potassium Yttrium Tungstate, $KY(WO_4)_2$, and Potassium Gadolinium Tungstate, $KGd(WO_4)_2$, are often used as host materials for trivalent rare-earth ion dopants.

For a large fiber core size silica or other glass-based fibers, a major concern is the thermal lensing effect. YAG crystal has the advantage of being about 10 times higher in thermal conductivity than silica glass fibers. In addition, the YAG crystal has a smaller change in refractive index as function of temperature, dn/dT, which is only about two thirds the value of the silica glass. For those reasons, the thermal lens effect is greatly reduced in YAG crystal. As an example, calculations show that even with a moderate laser efficiency of 65% and thermal conductivity of 10.7 W/m·° C. for a Yb:YAG crystal, a 10 cm long Yb:YAG fiber would be sufficient to dissipate heat from a 120 μm (micron) core for 0.5 kW output power. Compare this with at least a 100 cm long silica fiber to do the same job, requiring an even higher laser efficiency of 85%. Due to the extremely shortened fiber length requirement, the YAG crystalline fiber lasers will not generally have to be bent for packaging and cooling, which offers the potential for designing very compact LSMA (large single-mode area) fibers not subject to bending losses The laser induced damage threshold has been found to be greatly increased for single longitudinal and transverse mode lasers. The damage threshold for 1 ns pulse should be around 7 μJ/μm². For a 40 μm core size waveguide, the effective mode diameter will be around 49 μm, which will correspond to maximum pulse energy of 13 mJ (milliJoules). For a larger core size of 500 μm crystalline fiber waveguide, the maximum pulse energy in this case can reach about 832 mJ without damage to the waveguide core.

Nonlinear effects include Raman scattering (SRS) and stimulated Brillouin scattering (SBS), which are the two major nonlinear optical limitations in fiber lasers. For a single frequency laser, SBS will generally be the dominant nonlinear effect due to its relatively higher gain coefficient. In principle, the SBS free power is inversely proportional to the SBS gain coefficient as well as the fiber effective length. Therefore, considering that the SBS gain coefficient of YAG crystal is only one tenth or even less of the silica glass fiber, and the shortened length requirement, at least a 100 times higher SBS free power, or output energy of over 100 mJ should be expected in the YAG crystalline fiber.

Saturation fluence usually does not set an energy limitation for glass fibers due to the other lower energy limitations, such as laser-induced damage and nonlinear optical effects. However, due to the great improvements for those limitations in the YAG crystalline fiber-waveguides, the saturation fluence should be re-examined in the power scaling process. The maximum energy that can be extracted from a power amplifier is normally about 10 times of the saturation fluence of the laser gain medium. Take Er:YLF as an example, the reported saturation energy is about 0.245 μJ/μm². Thus, the maximum energy that can be achieved for a 300 μm core single-mode waveguide can be around 221 mJ. Once again, a large aperture waveguide has its advantages for high pulse energy.

From the above analysis, one can see that the ultimate energy limitation for a pulsed crystalline fiber laser will be mainly derived from the saturation fluence, laser damage and possibly the nonlinear effect. All those limitations point to a solution: large mode area. The largest mode area is obtained at the fundamental transverse mode of a waveguide. Therefore, single-mode operation of a laser waveguide is specially desired from a power scaling view of point.

Single-mode operation is also preferred in nonlinear waveguides for its tight confinement of the electric field and enhanced mode overlap between interacting beams. Nonlinear frequency conversion efficiency depends heavily on phase matching, modal overlap between interaction beams, and absolute beam intensity in the nonlinear crystal. The waveguide structure confines interaction beams in the small core region, thus greatly increasing the beam intensity and even operating at continuous-wave (CW) mode. Single-mode waveguide design enables optimized mode overlap between the interaction beams, resulting in higher conversion efficiency.

For both laser waveguide and nonlinear waveguides, single-mode emission at the output facet allows easy beam profile manipulation for subsequent applications.

Due to the above advantages, a single-mode laser waveguide is ideal for high power laser emission, while a single-mode nonlinear waveguide is ideal for high efficiency nonlinear frequency conversion. Accordingly, it is desirable to provide single-mode laser waveguides and single-mode nonlinear waveguides, given core size requirements and operational wavelengths.

Bonding laser material to similar laser material, and nonlinear material to similar nonlinear material, has been achieved by an Adhesive-Free Bonding (AFB®) technique developed by Onyx Optics, Dublin, Calif., U.S.A., U.S. Pat. No. 5,846,638, which is hereby incorporated by reference in its entirety for all purposes. In the past, other bonding techniques including but not limited to epoxy bonding, frit bonding, optical contacting, and chemically activated direct bonding (CADB®) have been reported.

Epoxy bonding is one of the most common methods to join two optical surfaces. It is reliable and manufacturable because it is an inexpensive process with high yield. However, since the thickness of the film left at the bonding interface is thick and uncontrollable, it is inappropriate for applications requiring precision thickness control. Scattering loss can also occur in these optically thick interfaces. Being organic material, epoxy is vulnerable to high-intensity optical powers or UV exposure. Moreover, epoxy bonds are not particularly heat resistant or chemically robust. The two optical surfaces can move under various thermal conditions since there is epoxy between them. Epoxy can also dissolve with chemical exposure and outgas and contaminate other optics if placed in vacuum environment. A layer of epoxy at the interface also introduces a material of a different refractive index that interferes with waveguide operation.

Frit bonding is an epoxy-free process that uses a low-melting-point glass frit as an intermediate bonding agent. It is widely used for both optical and MEMS (microelectromechanical systems) applications. The substrates are polished, cleaned, and coated with a glass frit. The pieces are baked together at high temperatures (in the range of 400° C. to 650° C.) and with moderate pressure. The benefit is that the bond is mechanically strong and chemically resistant. The drawbacks include increased scattering loss in the final interface since channels have to be made to allow frit to flow between the parts. The high temperatures during bonding can cause changes in the physical and chemical properties of the materials themselves, including changes in dopant concentrations and/or structure. An interface layer of a frit of generally unknown and often opaque characteristics renders waveguiding operation as is the subject of the present invention impossible.

Optical contacting is also an epoxy-free, room-temperature precision bonding process. The process results in 100% optically transparent optical paths with negligible scattering and absorptive losses at the interfaces, since the two surfaces are literally contacting each other without anything in between. In traditional optical contacting, the surfaces are polished, cleaned, and bonded together with no epoxies or cements and no mechanical attachments. Optical contacting has been used for years in precision optical shops to block optics for polishing because it removes the dimensional uncertainty of wax or adhesives. However, because the process is not very robust and optical contact can be easily broken, parts optically contacted in the traditional manner must be sealed around the edges to prevent breaking the contact. This requirement renders further processing as described below exceedingly difficult if not impossible.

Chemically activated direct bonding (CADB®) is an epoxy-free, solution-assisted optical-contacting process. Developed by Precision Photonics of Boulder, Colo., U.S.A., it is claimed to be a repeatable and manufacturable process that relies on a chemical activation of the surfaces becoming the bond interface with highly alkaline chemicals such as sodium and/or potassium silicate. The two surfaces to be bonded are brought into contact with each other, at which point the outer molecules from each surface bond together through hydrogen and silanol bonding. The parts are then annealed at a temperature specific to the substrate materials resulting in incomplete condensation reactions at the interface layer. During annealing chemical bonds are formed between the ions of each surface, often through an oxygen atom. CADB suffers from drawbacks, such as a chemical bond interface of a layer that is different from the two components to be bonded, therefore having lower intrinsic strength. There are hydroxyl groups remaining at the interface that cannot be removed by heat treatment, resulting in instability of the bond and continuing chemical reaction as function of time. This results in stress being developed, restrictions on the processing temperatures, and creation of an intermediate layer of different refractive index impeding the design and performance of waveguides of the present invention.

The adhesive-free bonding (AFB®) technique can create precise, optically transparent bonds that are robust and mechanically strong. These improved processes result in a bond as strong as if the entire structure had been made from a single piece of material. Such bonds have even passed telecommunication company Telcordia Technologies' stringent requirements for durability, reliability, and environmental stability. Because these bonds are devoid of any adhesive aids, they can withstand high optical powers. There are little-to-no scattering or absorptive losses at the interfaces and no outgassing. The bond is chemically resistant and can be used with a wide variety of materials; both similar and dissimilar crystals and glasses can be bonded. Modern day uses of this improved optical contacting technology include composite high-power laser optics (structures that have a doped "core" with a different cladding material), micro-optics, cryogenic optics, space optics, underwater optics, vacuum optics, and biocompatible optics.

U.S. Pat. No. 7,192,480 to Burrows, issued Mar. 20, 2007, discloses a proton exchange technique that has been used to fabricate a $LiNbO_3$ nonlinear waveguide by replacing $Li^+$ with $H^+$. An unfortunate effect of this method is that injection of protons will decrease nonlinearity of the waveguide and subsequently decrease frequency conversion capability of the waveguide.

U.S. Pat. No. 6,785,304 to Filgas, issued Aug. 31, 2004, mentions using high concentration and low concentration Nd:YAG crystal as core and cladding to control build-up of higher-order modes in the waveguide. However, no single-mode analysis was made or anticipated.

There exists a need in the art for improved waveguide structures and nonlinear optical media.

BRIEF SUMMARY

Generally, a laser waveguide or nonlinear optical crystal is made by cutting a single crystal boule of an anisotropic material at slightly different angles to produce a core crystal and surrounding cladding crystals. The core crystal is sandwiched between or surrounded by the cladding crystals. Because the crystals are anisotropic, the different cut angles result in different refractive indexes between the core and cladding as seen by a propagating light beam. The discontinuity at the interface between the core and cladding confines the beam to the core.

For effective mode confinement, the difference the between the refractive indexes should be greater-than-or-equal-to $1.2 \times 10^{-6}$. That is $|n_{core} - n_{clad}| \geq 1.2 \times 10^{-6}$.

Meanwhile, for effective single mode operation in a core with a square cross section:

$$\frac{2d}{\lambda} \sqrt{n_{core}^2 - n_{clad}^2} \leq 1.37$$

where d is the thickness of the core and $\lambda$ is the wavelength of the propagating light beam.

For a core with planar cross section, the left hand side of the equation is $\leq 1$.

As an alternative to using anisotropic crystals at different angles, crystals with different dopant-to-host concentrations may be used in order to achieve the difference in refractive indexes. The differences in dopant concentrations are on the order of 0.1% to 2.0% in order to achieve the proper refractive index differences.

Embodiments of the present invention enable the engineered design of adhesive-free bonded single-mode or multimode laser waveguides and nonlinear waveguide structures. Such components typically provide a continuously tunable refractive index difference, $\Delta n = |n_{core} - n_{clad}|$, between the core and inner cladding of a waveguide, for laser waveguides made of anisotropic laser materials, and for nonlinear waveguides made of either uniaxial and biaxial nonlinear crystals.

In this context, terms such as "tuning" $\Delta n$, and $\Delta n$ being "tunable" are used in the sense of selecting $\Delta n$ at the time of manufacturing the waveguide structure and are not used in the sense of varying $\Delta n$ during use of the waveguide. Embodiments of the present invention provide an AFB®-compatible technique that enables continuous tuning of the refractive index difference between the core and the inner cladding to cope with arbitrary waveguide core sizes and operational wavelengths to fulfill the intrinsic single-mode condition.

Providing a continuously tunable refractive index difference ($\Delta n$) for anisotropic laser and NLO crystals is based on the birefringence of optical materials. Birefringence is found in uniaxial materials and biaxial materials. For uniaxial materials, if the light polarization is parallel to the optical axis, it experiences an extraordinary refractive index $n_e$; if the light polarization is perpendicular to the optical axis, it experiences an ordinary refractive index $n_o$.

In negative crystals, $n_o > n_e$, so the optical axis of the core material should be set perpendicular to the incoming light. To obtain a small difference $\Delta n$, the optical axis of the cladding material should be slightly tilted so that the refractive index n' experienced by light is slightly lower than $n_o$, but greater than $n_e$.

Nevertheless, this slight refractive index difference $\Delta n = n_o - n'$ is enough for fulfilling the single-mode condition. The larger the core size, the smaller NA is required, and equally smaller refractive index difference, and equally smaller off-axis angle. The longer the operation wavelength, the larger NA can be allowed, and equally larger refractive index difference tolerance, and equally larger off-axis angle tolerance.

In positive crystals, $n_e > n_o$, so the polarization of incoming beam is reversed as compared to the situation in negative crystals. By precisely orienting the cladding material optical axis within the design allowance, intrinsic single-mode operation can be achieved.

In biaxial nonlinear optical (NLO) crystals, the deviation of the refractive index caused by tilting the inner cladding is more complicated, but the basic principle is similar.

For some nonlinear conversion process, due to limitations exerted by phase matching conditions, or the use of a specific nonlinear coefficient, such as $d_{33}$ in $LiNbO_3$, the polarization of interaction beams should be aligned in such a way that they experience the smallest refractive index of the two. That is, $n_e$ in the case of periodically poled $LiNbO_3$. In such cases, the core is slightly tilted to obtain a slightly higher refractive index than $n_e$, with respect to on-axis cladding, which still have a refractive index of $n_e$.

One aspect of some embodiments is the engineered single-mode output from the waveguide. For laser waveguides, it enables power scaling by mitigating the thermal lens effect and the nonlinear effect, and increasing saturation fluence. For nonlinear waveguides, it enables more efficient frequency conversion due to optimized mode overlap between two or more interaction beams.

Another aspect is the enhanced effective interaction length due to employment of the waveguide structure. For both laser and nonlinear waveguides, the waveguide structure ensures a long effective interaction length via tight confinement of the electric field of the propagating beams in it. Thus long components can be used to achieve better performance.

Another aspect is the improved mode profile at the waveguide output end. For both laser and nonlinear waveguides, the emission from the output facet can be designed to be single-mode, which makes beam profile manipulation easier for subsequent applications.

Another aspect is the wide and continuous tuning range of the refractive index difference $\Delta n$ between the core and the inner cladding. Theoretically, the tuning range of $\Delta n$ is from 0 to $|n_e - n_o|$, which fulfills the single-mode condition of a wide range of core size from ~3 μm to infinite at normal operation wavelength. However, considering the fact that if $\Delta n$ is too small, the confinement of modes in the waveguide will become extremely weak. Therefore, the maximum core width is recommended not to exceed 300 μm, which results in $\Delta n = 1.2 \times 10^{-6}$. Such small refractive index difference is easily achieved with ~0.5° tilting angle. In other words, the invention provides great amount of flexibility for choice of core sizes and operation wavelength.

Another aspect is that the same material is used for the waveguide core and inner cladding. As mentioned before, the refractive index difference required between core and inner cladding for intrinsic single-mode operation is considerably stringent. It is difficult, or almost impossible to find other materials for a certain core material of arbitrary size with such small refractive index difference ($\sim 10^{-4} \sim 10^{-5}$) to achieve intrinsic single-mode operation. The disclosure enables implementation of waveguide structures for many uniaxial and biaxial nonlinear crystals and anisotropic laser materials.

Another aspect is the compatibility of this waveguide fabrication method with the Adhesive-Free Bonding (AFB®) technique. A rigid and strong bonding between two components requires similar crystal structure and coefficient of thermal expansion (CTE). Slightly tilted material for either cladding or core introduces minimal discrepancy in crystal structure misalignment, and minimal CTE change. Therefore, the techniques disclosed herein are compatible with an adhesive-free fabrication process. Device components can be produced readily with expected modeled performance.

While some embodiments achieve fine tuning of $\Delta n$ by tilting the optic axis of the cladding relative to that of the core, it is also possible to achieve fine tuning of $\Delta n$ by using the same material for the cladding and the core but providing different doping levels.

In one embodiment, the core is x % rare-earth trivalent ion-doped anisotropic laser crystal, while the cladding is also x % rare-earth trivalent ion-doped anisotropic laser crystal of the same kind, but possesses a slight angle with respect to the optical axis to generate a refractive index difference $\Delta n$ to core material. In certain aspects, rare-earth trivalent ion doped anisotropic laser crystal is selected from Nd:YLF, Nd:YALO, Nd:YVO$_4$, Nd:KYW, Nd:KGW, Yb:YALO, Yb:YLF, Yb:S-FAP, Yb:KYW, Yb:KGW, Er:YALO, Er:YLF, Er:Y$_2$O$_3$, Tm:YLF, Tm:YALO, Ho:YALO, Ho:YLF, and Ho:BYF.

In one embodiment, the core is a uniaxial positive nonlinear crystal, where the incoming beam polarizes along the optical axis so it experiences the largest refractive index $n_e$. The cladding is the same nonlinear crystal with a slight tilt angle with respect to the optical axis so it experiences a slightly lower refractive index. In certain applications, uniaxial positive nonlinear crystal is selected from the group including ZGP.

In one embodiment, the cladding is a uniaxial negative nonlinear crystal, where the incoming beam polarizes along the optical axis so it experiences the smallest refractive index $n_e$. The core is the same nonlinear crystal with a slightly tilted angle with respect to its optical axis so it experiences a slightly higher refractive index. In certain aspects, the uniaxial negative nonlinear crystal is selected from the group consisting of $\beta$-BaB$_2$O$_4$, CsLiB$_6$O$_{10}$, LiNbO$_3$, MgO:LiNbO$_3$, AgGaS$_2$, and AgGaSe$_2$.

In one embodiment, the core and cladding are a biaxial nonlinear crystal. The core is on-axis while the cladding is slightly off-axis. The off-axis angle may be rotated in a three dimensional Cartesian coordinate system to enable waveguiding for all interaction beams. In certain applications, the biaxial nonlinear crystal is selected from the group consisting of KTP (KTiPO$_4$), LiBO$_5$, KNbO$_3$, CsB$_3$O$_5$, BiB$_3$O$_6$, CsTiAsO$_4$, and RbTiOAsO$_4$.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 4A is an isometric view of a planar waveguide apparatus in accordance with an embodiment.

FIG. 4B is an isometric exploded view of the waveguide apparatus of FIG. 4A.

FIG. 4C is an end view of a waveguide apparatus of FIG. 4A.

DETAILED DESCRIPTION

Figure 1:
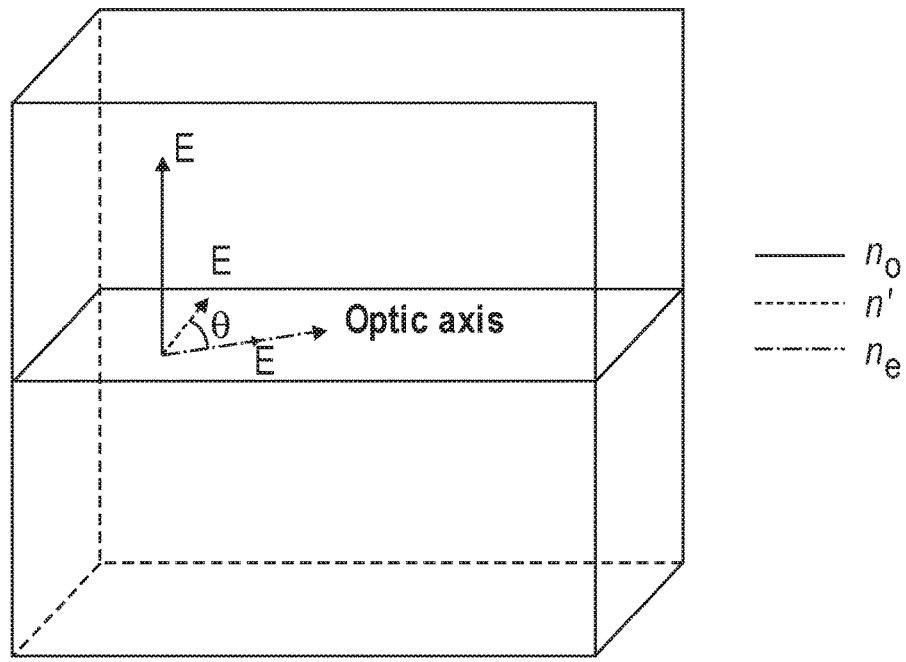
FIG. 1 illustrates a light beam propagating in a uniaxial nonlinear crystal or anisotropic laser crystal.

Considerations for Establishing Desired Single-Mode or Multimode Operation

Forming an intrinsic single-mode waveguide structure often requires selecting the core and cladding materials with an appropriate refractive index difference $\Delta n = |n_{core} - n_{clad}|$.

For planar waveguides, intrinsic single-mode in the lateral direction largely requires Eq. (2) to be fulfilled:

$$\frac{2d}{\lambda}\sqrt{n_{core}^2 - n_{clad}^2} < 1 \qquad (2)$$

where d is the waveguide core width in the guiding direction and $\lambda$ is the wavelength of light.

In comparison, for a circular cross section channel waveguide, i.e., conventional glass fiber, intrinsic single-mode operation largely requires Eq. (3) to be fulfilled:

$$\frac{2d}{\lambda}\sqrt{n_{core}^2 - n_{clad}^2} < 1.53 \qquad (3)$$

where d is the core diameter and $\lambda$ is the wavelength of light.

For square cross section channel waveguides, e.g., an adhesive-free bonded crystalline fiber waveguide, intrinsic single mode largely requires Eq. (4) to be fulfilled:

$$\frac{2d}{\lambda}\sqrt{n_{core}^2 - n_{clad}^2} < 1.37 \qquad (4)$$

where d is the core width and $\lambda$ is the wavelength of light.

The quantity on the left hand side of Eq. (2)-(4) is twice the characteristic core dimension divided by the wavelength times the numerical aperture. The quantity on the right side of the equations is a threshold for the different representative waveguide geometries.

When the value of $(2d/\lambda)*NA$ is less than the threshold value, only the lowest-order mode is allowed in the waveguide. In this case, some of the energy in the incident beam would be coupled into the mode, with the remainder lost to mode mismatch.

When the value of $(2d/\lambda)*NA$ is greater than the threshold value, there exists a design region where the number of actually observed modes depends on the actual experimental conditions. That is, with such waveguide design, multimode operation becomes a possibility rather than something certain to happen. Single-mode output with a multimode design can still occur with more constrained experimental conditions of input beam quality, such as an incident angle parallel to the input end normal, and diffraction-limited beam quality with $M^2$ value close to 1. The more mode numbers that are to be allowed by the design, the better the input beam quality must be to achieve actual single-mode output.

Consider the use of a waveguide as an amplifier in a laser-pumped system, as opposed to diode-pumped system. A laser pump typically has better beam quality than a diode pump, and can implement actual single-mode output more easily than a diode pump, even though the waveguide is designed for low-order multimode with $(2d/\lambda)*NA$ larger than the corresponding threshold. The better the beam quality of the pump, the larger $(2d/\lambda)*NA$ can be while still resulting in single-mode output.

Achieving Index Differences (Different Dopant Concentration Vs. Optical Axes at an Angle)

The core size is typically few tens of thick microns, and the operation wavelength is typically between 0.5 and ~2 microns. For this case, the refractive index difference between the core and inner cladding should be within a few $10^{-4}$ to fulfill the above inequalities. Operation wavelengths between 390 nm and 700 nm for visible light, between 700 nm and 1 mm for infrared light, and other wavelengths are envisioned. The present disclosure demonstrates the methodology of selecting and manipulating laser and nonlinear materials to implement intrinsic single-mode operation.

The suitable cladding material should meet the following criteria:
1) The refractive index should be slightly smaller (by ~$10^{-4}$) than the core material, for both fundamental and harmonic conversion waves;
2) The crystal structure should be similar or the same as the core material in order to implement adhesive-free-bonding; and
3) The refractive index should be selectable in a certain range to fulfill single transverse-mode operation.

One way to achieve a small refractive index difference $\Delta n$ is to use material with a higher dopant concentration in the core and lower dopant concentration in the inner cladding, with the same host material. An example of a waveguide made of isotropic crystal materials, a planar waveguide, with a lateral width of 25 μm, has core material of 3% Yb:YAG and inner cladding of 2.5% Yb:YAG. The outer cladding is sapphire, which has higher thermal conductivity and mechanically supports the waveguide structure. This technique of obtaining $\Delta n$ between the core and the cladding can also be used for anisotropic laser crystals.

A constraint of using a dopant concentration difference to achieve an index difference is that there may be a limited number of material dopant concentrations available. That is, the proper combination may or may not exist due to a limited selection of available crystals. Further, reproducibility, in terms of refractive index difference from one batch of crystals to the next and of the uniformity of dopant concentration from one end of a crystal to the other, may be an issue. To achieve proper doping concentrations, the refractive index difference would likely need to be measured using an interferometric method. Once that is established, the waveguide core size may need to be adjusted to maintain single-mode operation.

Within the constraints of anisotropic crystals with different refractive indices, it may or may not be possible to achieve a waveguide with desired geometrical parameters. There is a dearth of crystal materials that have a matching coefficient of thermal expansion (CTE), lattice spacings, and other important parameters.

Yet, for anisotropic laser materials such as YLF and nonlinear crystals, the refractive index of light changes with incidence angle. The inventors recognized that crystals can be cut at precise angles to very tight tolerances and then joined with little-to-no interface between their flat surfaces. Therefore it is possible to either increase or decrease a refractive index by slightly tilting the material to reach desired index difference value.

Technical advantages of this angle-tilting method are: a) only one type of crystal or crystal boule is needed; b) the CTE is well compatible between the core and inner cladding because the tilt angle (e.g., ±1°) is small enough to make an immaterial difference in CTE; and c) a continuously tunable refractive index difference as function of tilt angle is available for design purposes. Therefore, the core cross section of the core can be designed simply based on the tilt angle and a predictable refractive index difference. This is done without the need of trying to match the core and the inner cladding with two different crystal materials or rely upon a crystal manufacturer's doping precision. Different boules may have slightly different impurities and thus slightly different refractive indexes. Using the same boule for both the core and cladding can eliminate reliance on the manufacturer's tolerances such that an in-house process can concentrate on measuring and cutting at the proper angle to give a desired difference in refractive indexes.

Various Types of Anisotropic Materials

FIG. 1 illustrates a light beam propagating in a uniaxial nonlinear crystal or anisotropic laser crystal. Light with different polarizations experiences differences in refractive indexes when propagating in uniaxial material, due to birefringence. The refractive index equals $n_e$ when the polar angle θ between the polarization and the optical axis is 0 (parallel), $n_o$ when the polar angle θ between the polarization and optical axis is π/2 (perpendicular), and n', min($n_e$, $n_o$)<n'<max($n_e$, $n_o$) when the polar angle θ between the light polarization and optical axis follows the relationship 0<θ<π/2.

Refractive index n' is a function of polarization angle θ and quantified by Eq. (5):

$$n^e(\theta) = n_e \sqrt{\frac{1+\tan^2\theta}{1+(n_e/n_o)^2 \tan^2\theta}} \quad (5)$$

n' can also be viewed as the distance between any point on the refractive index ellipse and its center with polar angle θ, where the refractive index ellipse has a long axis of max($n_e$, $n_o$) and a short axis of min($n_e$, $n_o$). Therefore, by adjusting the polar angle θ, one may continuously tune the refractive index difference between 0 and |$n_e$-$n_o$|.

Figure 2:
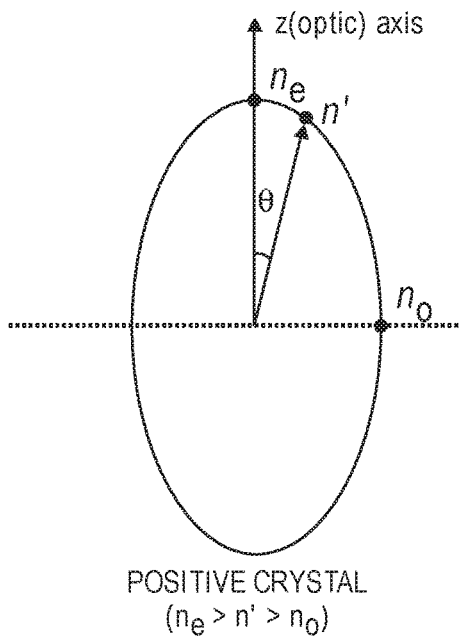
FIG. 2 illustrates a refractive index ellipsoid of rotation in a positive ($n_e > n' > n_o$) uniaxial nonlinear crystal or anisotropic laser crystal.

FIG. 2 illustrates a refractive index ellipsoid of rotation in a positive ($n_e$>n'>$n_o$) uniaxial nonlinear crystal or anisotropic laser crystal. The ellipse has a long axis of $n_e$ and a short axis of $n_o$. The actual refractive index with an arbitrary polar angle θ is the distance between the point with polar angle θ on the ellipse and its centroid.

For positive uniaxial material, $n_e$>$n_o$, the optical axis of the core material should be parallel to the light polarization, while the optical axis of the cladding should be slightly tilted.

Figure 3:
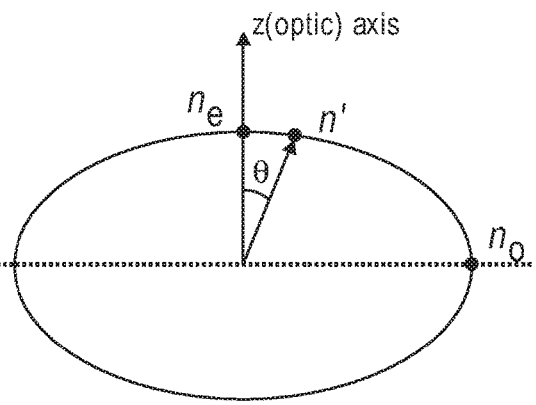
FIG. 3 illustrates a refractive index ellipsoid of rotation in a negative ($n_o > n' > n_e$) uniaxial nonlinear crystal or anisotropic laser crystal. The ellipse has a long axis of $n_o$ and a short axis of $n_e$.

FIG. 3 illustrates a refractive index ellipsoid of rotation in a negative ($n_o$>n'>$n_e$) uniaxial nonlinear crystal or anisotropic laser crystal. The ellipse has a long axis of $n_o$ and a short axis of $n_e$. The actual refractive index with an arbitrary polar angle θ is the distance between the point with polar angle θ on the ellipse and its centroid.

For negative uniaxial material, $n_o$>$n_e$, the optical axis of the cladding material should be parallel to the light polarization, while the optical axis of the core should be slightly tilted.

Therefore, it is almost always is possible to design a Δn in a uniaxial laser crystal that will result in waveguiding, single-mode or multimode operation, depending on the magnitude of Δn and the core cross section.

In neither the positive nor negative uniaxial nonlinear optical crystals can a waveguide structure be achieved if two or more interaction beams have orthogonal polarization. This is because the ordinary beam and the extraordinary beam experience an opposite refractive index change in an optical-axis-tilted crystal with respect to an on-axis crystal. Although a nonlinear waveguide for a normal type I or type II conversion is not achievable with such a technique due to the fact that interaction beams with orthogonal polarizations are common in nonlinear conversions, nonlinear frequency conversion still takes place as long as an electric field distribution is present in the nonlinear crystal.

FIGS. 4A-4E illustrate a planar waveguide apparatus in accordance with an embodiment. In assembly 400, waveguide system 401 is constructed of five layers.

Core and inner cladding waveguide 402 are sandwiched by outer cladding 403, which provides mechanical support and a thermal conduit. Outer cladding 403 can be a wide variety of materials, such as silica glass, yet it may be sapphire for greater thermal conductivity. Electromagnetic radiation propagates in the direction of light beam propagation axis 410.

FIG. 4B shows an exploded view of the five layers. Anisotropic core crystal 405 has two flat planar surfaces 409 and 411 that are parallel and opposite to one another. Its thickness d is a constant between the two surfaces. The core is configured such that it is parallel with light beam propagation axis 410.

For core and inner cladding waveguide 402, a pair of anisotropic cladding crystals 406 and 407 with flat surfaces 408 and 410, respectively, sandwiches core crystal 405. Bottom flat surface 408 of cladding crystal 406 is directly and intimately joined with top flat surface 409 of core crystal 405. Top flat surface 410 of cladding crystal 407 is directly and intimately joined with bottom flat surface 411 of core crystal 405.

Outer cladding 403 is joined on the top and bottom of waveguide 402 to sandwich it.

Figure 4E:
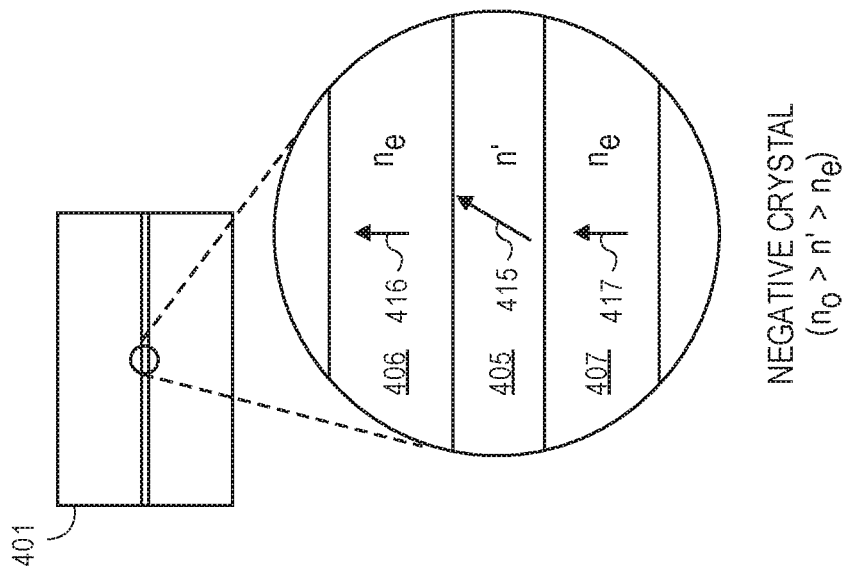
FIG. 4E is a side view of a waveguide apparatus of FIG. 4A with a negative crystal.
Figure 4D:
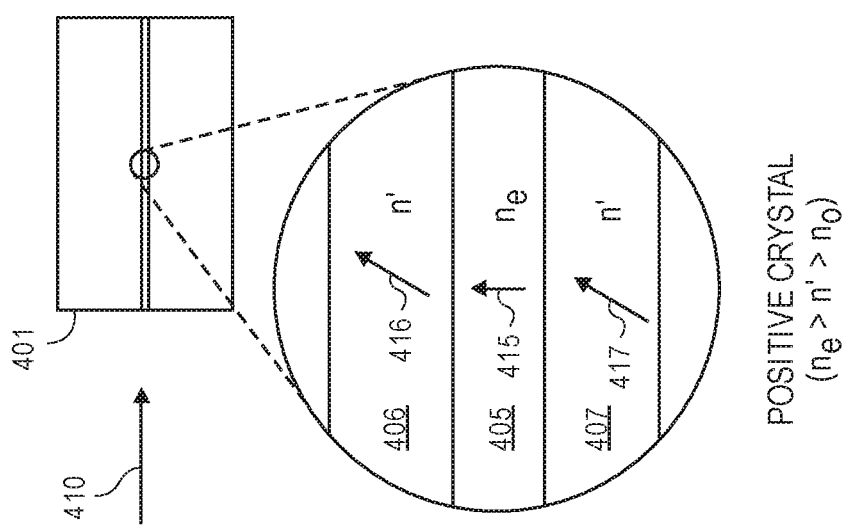
FIG. 4D is a side view of a waveguide apparatus of FIG. 4A with a positive crystal.

FIGS. 4C-4E illustrate crystal alignments in core crystal 405 and inner cladding crystals 406 and 407. Viewed end on (in FIG. 4C), core optical axis 415 appears straight up and down, like cladding optical axes 416 and 417 in upper and lower inner cladding crystals 406 and 407.

Viewed to the side in a positive crystal (in FIG. 4D), core optical axis 415 is straight up and down but cladding optical axes 416 and 417 are tilted. This results in a light beam seeing refractive indexes $n_{core}$=$n_e$ and $n_{clad}$=n'.

Viewed to the side in a negative crystal (in FIG. 4E), core optical axis 415 is tilted but cladding optical axes 416 and 417 are straight up and down. This results in a light beam seeing refractive indexes $n_{core}$=n' and $n_{clad}$=$n_e$.

In the embodiment of the figures, width d is contact throughout the cross section. In some embodiments, d may change linearly along the axis of light beam propagation to form wedge.

FIGS. 5A-5D illustrate a square cross-section waveguide apparatus in accordance with an embodiment. In assembly 400, waveguide system 501 is constructed of multiple layers in which a square waveguide is sandwiched from the top and bottom and from the sides by inner cladding crystals.

Core and inner cladding waveguide 502 are sandwiched by outer cladding 503, which provides mechanical support and a thermal conduit. Electromagnetic radiation propagates in the direction of light beam propagation axis 510.

Figure 5A:
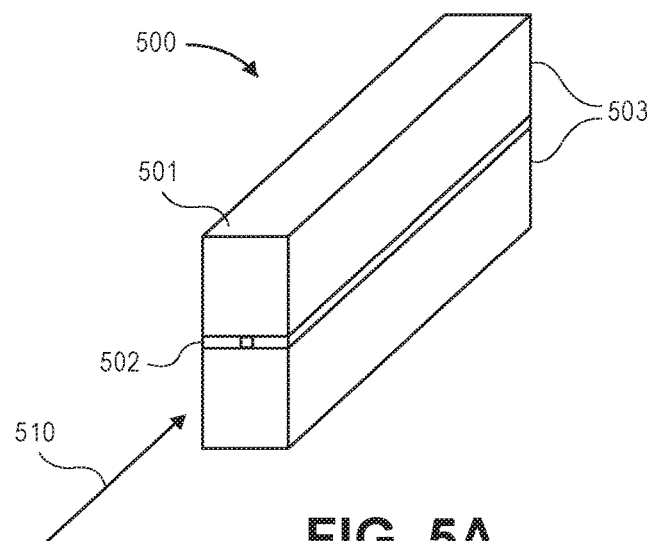
FIG. 5A is an isometric view of a square cross-section waveguide apparatus in accordance with an embodiment.
Figure 5B:
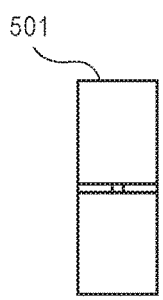
FIG. 5B is an end view of a waveguide apparatus of FIG. 5A.
Figure 5C:
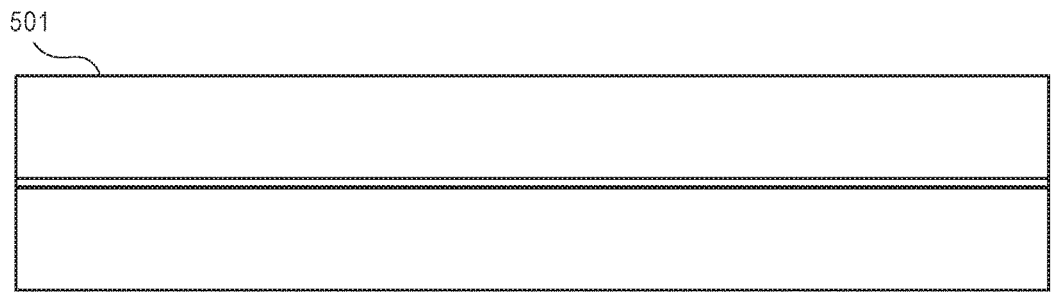
FIG. 5C is a side view of a waveguide apparatus of FIG. 5A.
Figure 5D:
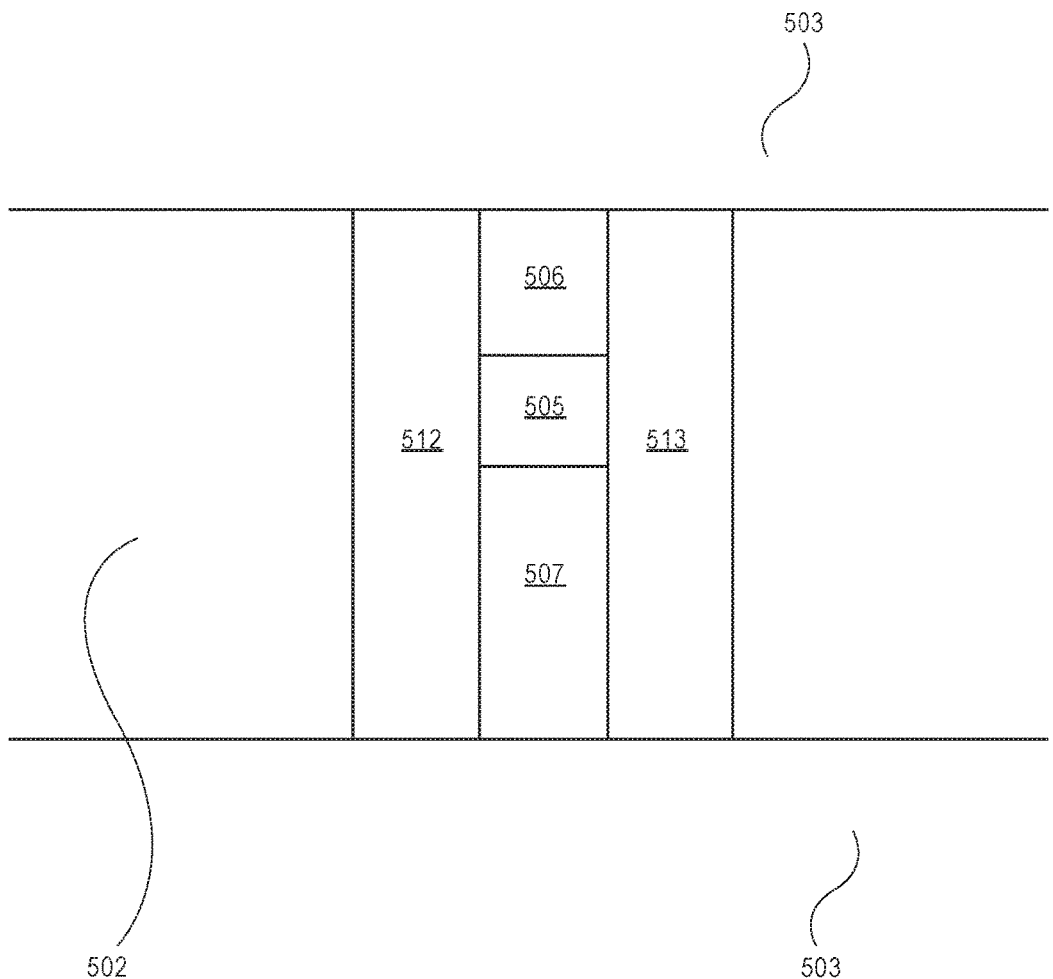
FIG. 5D is a close up view of the middle center of end view of FIG. 5B.

FIG. 5D is a close up view of the small rectangular region of 502. Core crystal 505 is sandwiched by inner cladding 506 and 507 on the top and bottom as well as inner cladding 512 and 513 from the left and right sides.

Either the core optical axis is straight and the cladding optical axis is tilted or the core optical axis is tilted and the cladding optical axis is straight. The difference in optical axis orientations causes a difference in refractive indexes of the materials as seen by a beam of propagating light.

The above technique can be combined with a periodically poling technique to fabricate a periodically poled nonlinear waveguide to enhance frequency conversion efficiency by fulfilling a quasi-phase matching condition.

Figure 6A:
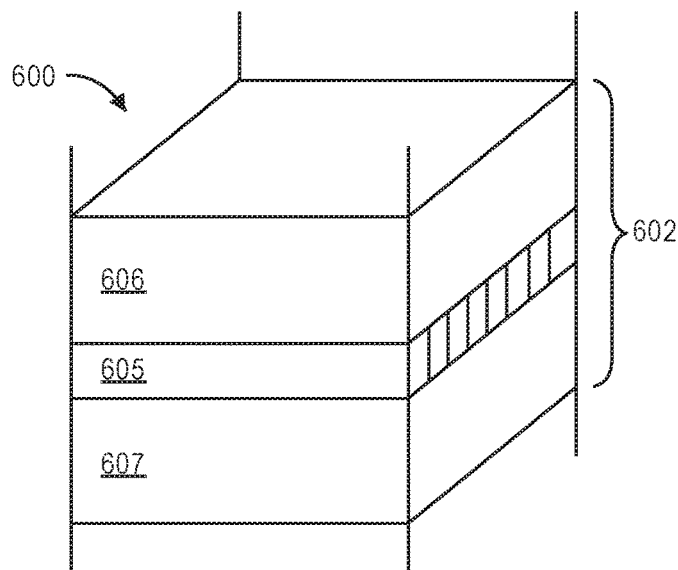
FIG. 6A shows a periodically poled waveguide with a uniaxial material in accordance with an embodiment.
Figure 6B:
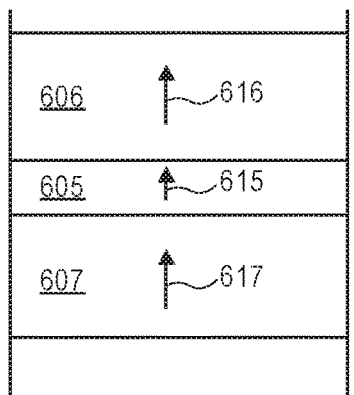
FIG. 6B is an end view of a waveguide apparatus of FIG. 6A.
Figure 6C:
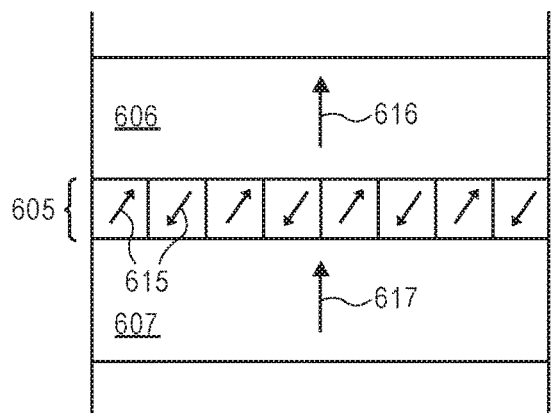
FIG. 6C is a side view of a waveguide apparatus of FIG. 6A.

FIGS. 6A-6C illustrate a periodically poled waveguide with a uniaxial material, such as $LiNbO_3$. In system 600, all interaction beams are polarized along the z-axis and can be waveguided in waveguide 602. A periodically poled $LiNbO_3$ waveguide is fabricated by an adhesive-free bonding technique where an optical axis 605 of core crystal 605 is slightly tilted while an optical axis 616 and 617 of cladding crystals 606 and 607 is not. In such a waveguide, all beams are polarized in the same direction so that waveguiding is possible.

Although no critical phase matching can be achieved with all interaction beams polarized in the same direction, after a certain propagation distance where the phase mismatch accumulates to integer multiples of π, the domain flips so as to change the sign of the nonlinear coefficient. In this way, the electric field of converted radiation keeps growing, with all beams confined and well overlapped in the waveguide structure.

Biaxial Crystals

While conventional type I or type II nonlinear frequency conversion may not be implemented in a waveguide employing uniaxial crystals, they are feasible in biaxial crystals.

Figure 7:
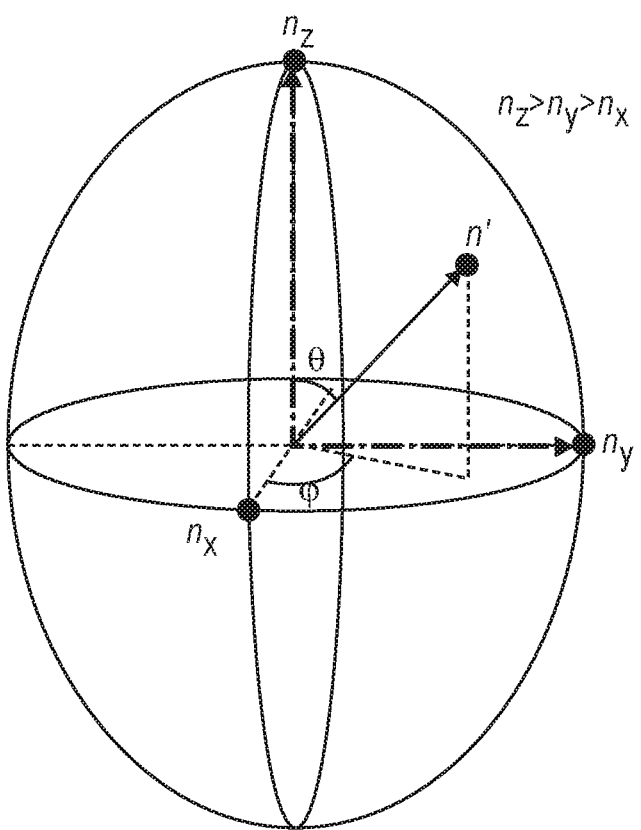
FIG. 7 shows a refractive index ellipsoid of a biaxial material, with axes $n_x$, $n_y$, and $n_z$, where $n_x < n_y < n_z$.

FIG. 7 shows a refractive index ellipsoid of a biaxial material, with axes $n_x$, $n_y$, and n, where $n_x < n_y < n_z$. The actual refractive index with arbitrary polar angle θ and azimuth angle φ is defined as the distance between the point with a corresponding polar angle θ and azimuth angle φ on the ellipsoid surface to its centroid.

Biaxial materials demonstrate a refractive index ellipsoid instead of a refractive index ellipse as in uniaxial materials, with axes $n_x$, $n_y$, and n, where $n_x < n_y < n_z$. The actual refractive index with arbitrary polar angle θ and azimuth angle φ is defined as the distance between the point with the corresponding polar angle θ and azimuth angle φ on the ellipsoid surface to its centroid.

Figure 8:
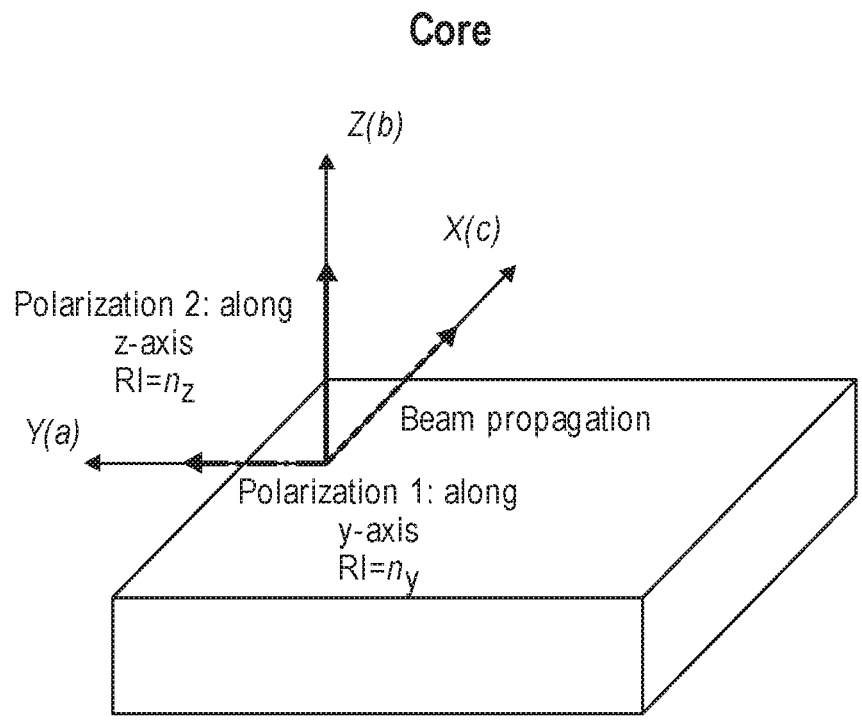
FIG. 8 illustrates a core using biaxial nonlinear materials where light propagates on the x-axis in accordance with an embodiment. The core employs on-axis material, while the inner cladding employs slightly off-axis material to form the waveguide structure.
Figure 9:
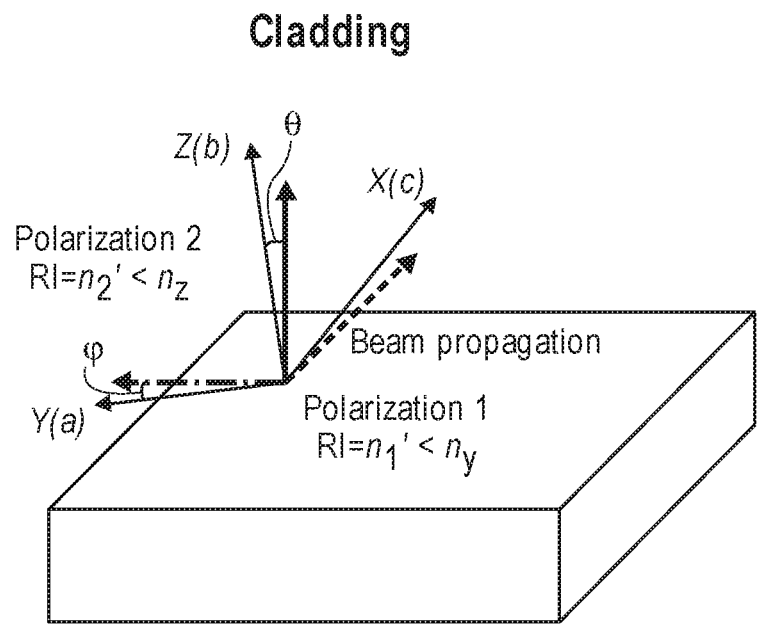
FIG. 9 illustrates an inner cladding to be used with the core of FIG. 8.

FIGS. 8-9 illustrate a light beam propagating along the x-axis and two orthogonal polarizations in the y-z plane. For simplicity, we assume they are polarized along the y-axis with refractive index $n_y$ and the z-axis with refractive index $n_z$, respectively. If we tilt the crystal first with angle θ with respect to y-axis, and then angle φ with respect to the original z-axis (see FIG. 9), i.e., in the original x-y plane, the beam originally polarized along they-axis will now experience refractive index $n_1'$ with $n_x < n_1' < n_y$, and the beam originally polarized along the z-axis will now experience a refractive index $n_2'$ with $n_x < n_2' < n_z$. Both refractive indices decrease. Therefore, the tilted biaxial material may be used as cladding bonded to the same un-tilted material as core. It is evident that the situation for obtaining a Δn in a biaxial laser crystal is similar to a uniaxial laser crystal where no interacting beams need to be considered.

Figure 10:
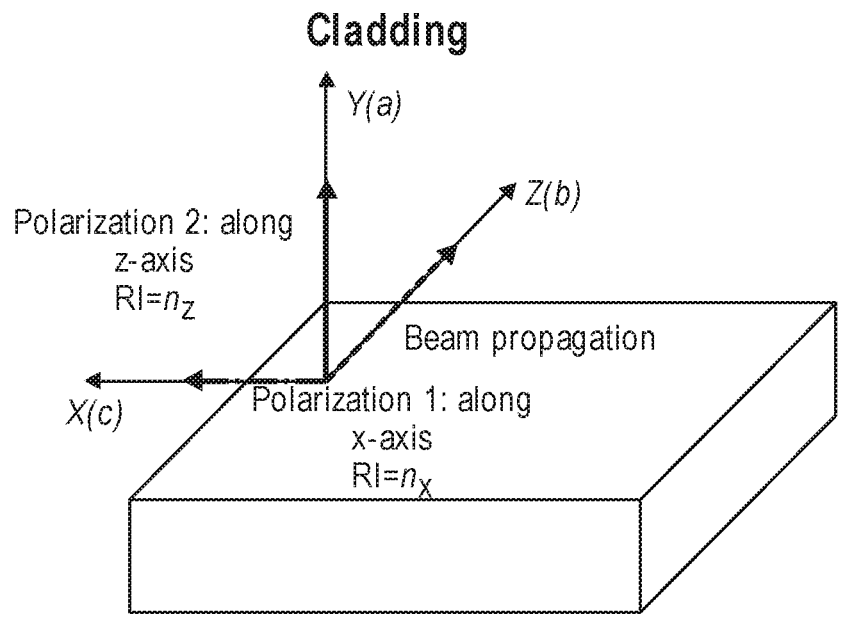
FIG. 10 illustrates a core using biaxial nonlinear materials where light propagates on the z-axis. The inner cladding employs on-axis material, while the core employs slightly off-axis material.
Figure 11:
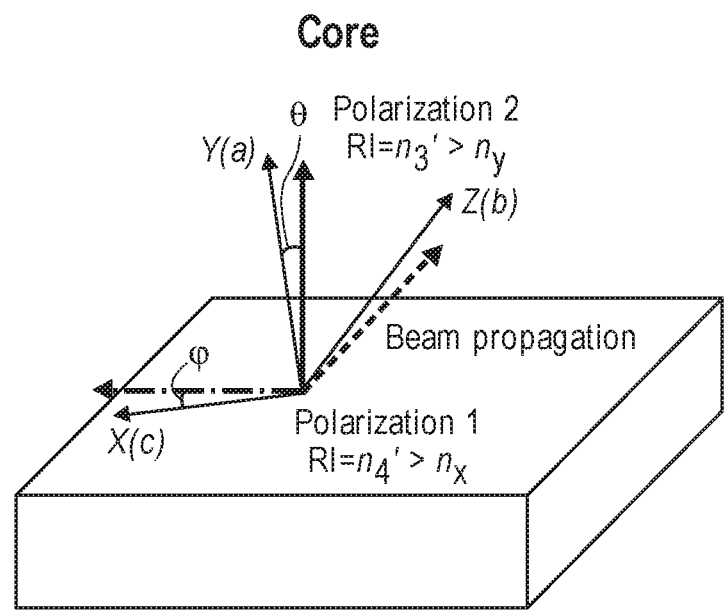
FIG. 11 illustrates an inner cladding to be used with the core of FIG. 10.

FIGS. 10-11 illustrate a light beam propagating along the z-axis and the two orthogonal polarizations will be in the y-x plane. For simplicity, we assume they are polarized along the y-axis with refractive index $n_y$ and the x-axis with refractive index $n_x$, respectively. If we tilt the crystal first with angle θ with respect to x-axis, and then with angle φ with respect to the original y-axis, i.e., in the original x-z plane, the beam originally polarized along they-axis will now experience refractive index $n_3'$ with $n_y < n_3' < n_z$, and the beam originally polarized along the x-axis will now experience refractive index $n_4'$ with $n_x < n_4' < n_z$. We find that both refractive indices increase. Therefore, the tilted biaxial material may be used as core bonded to the same un-tilted material as cladding.

Figure 12:
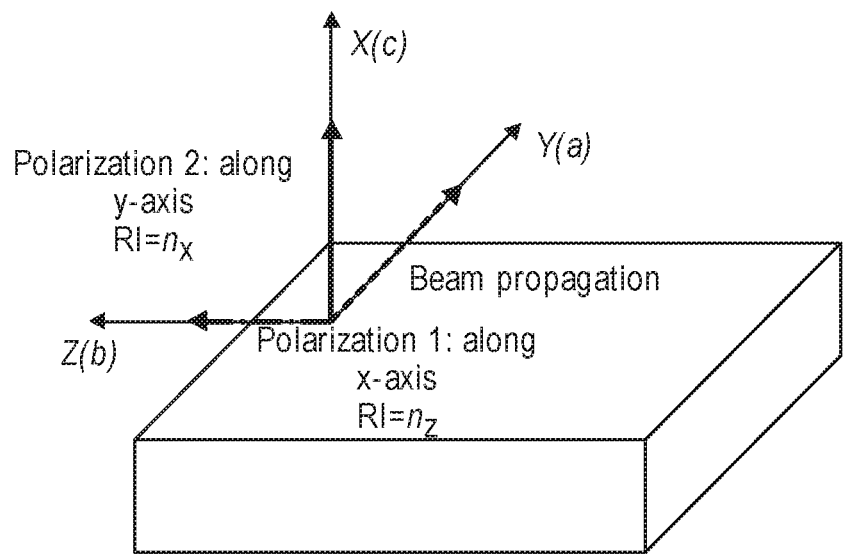
FIG. 12 illustrates a core using biaxial nonlinear materials where light propagates on the y-axis. No proper orientation of material can be found to form a waveguide structure.
Figure 13:
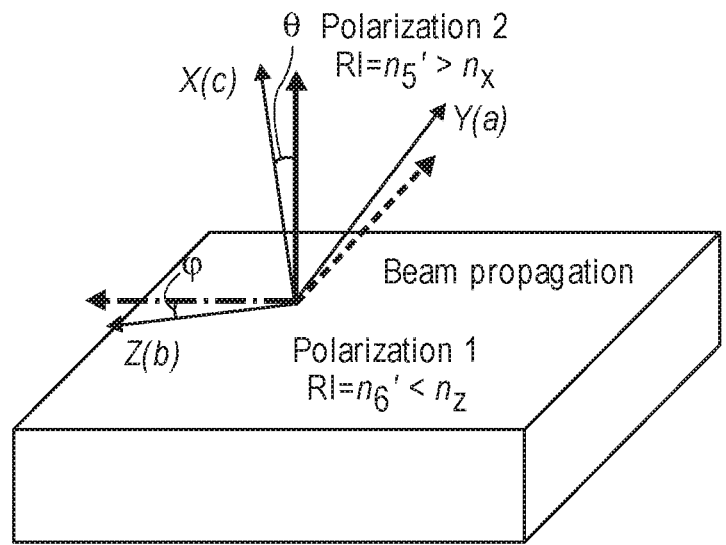
FIG. 13 illustrates a cladding using biaxial nonlinear materials where light propagates on the y-axis, conceptually to be used with that in FIG. 12.

FIGS. 12-13 illustrate a light beam propagating along they-axis and the two orthogonal polarizations will be in the z-x plane.

If we assume the beams are polarized along the z-axis and the x-axis respectively, we find the refractive index change will always go the opposite way no matter how we tilt the crystal, since $n_z$ is the largest refractive index possible and it always decreases, while $n_x$ is the smallest refractive index possible and it always increases. In that case, as long as the phase-matching condition does not require strictly that the two orthogonal polarizations be polarized along the x-axis and the z-axis, it is still possible that the sign of refractive index change of the two beams is the same, i.e., they both increase or both decrease, so that a waveguide structure is feasible.

FIGS. 14A-14I illustrate a fabrication process of a double-clad laser waveguide such as that shown in FIG. 5A. The process consists of at least eight major steps. Each step includes cutting, polishing and heat treatment.

Figure 14A:
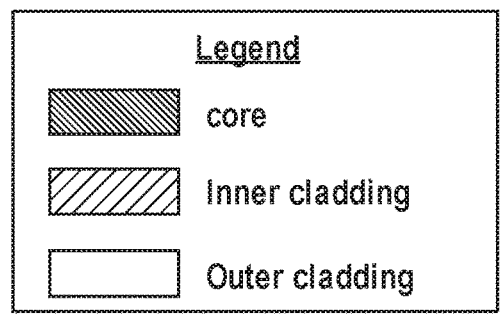
FIG. 14A shows a legend for a double-clad laser waveguide fabrication process in accordance with an embodiment.
Figure 14B:
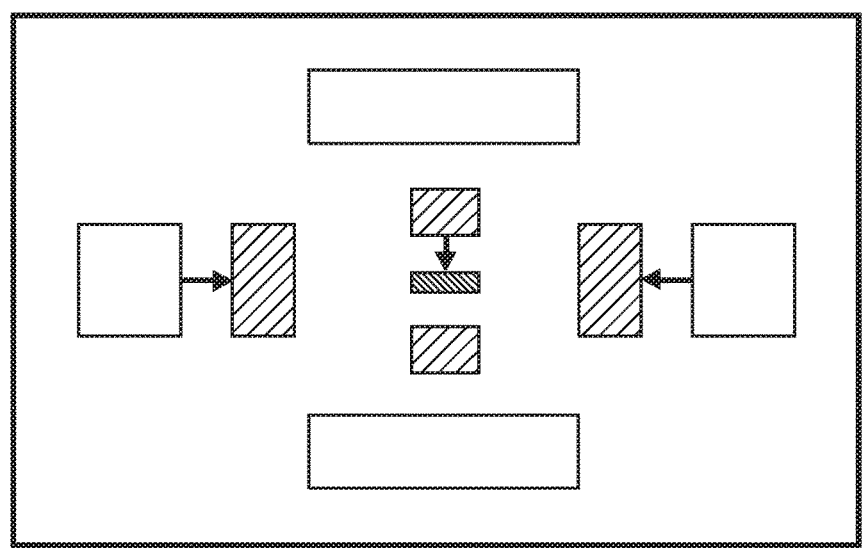
FIG. 14B shows a step in a double-clad laser waveguide fabrication process in accordance with an embodiment.

FIG. 14B illustrates an adhesive free bonding of one of the inner cladding crystals to the core crystal. It also shows the adhesive free bonding of left and right outer cladding crystals to left and right inner cladding crystals.

Figure 14C:
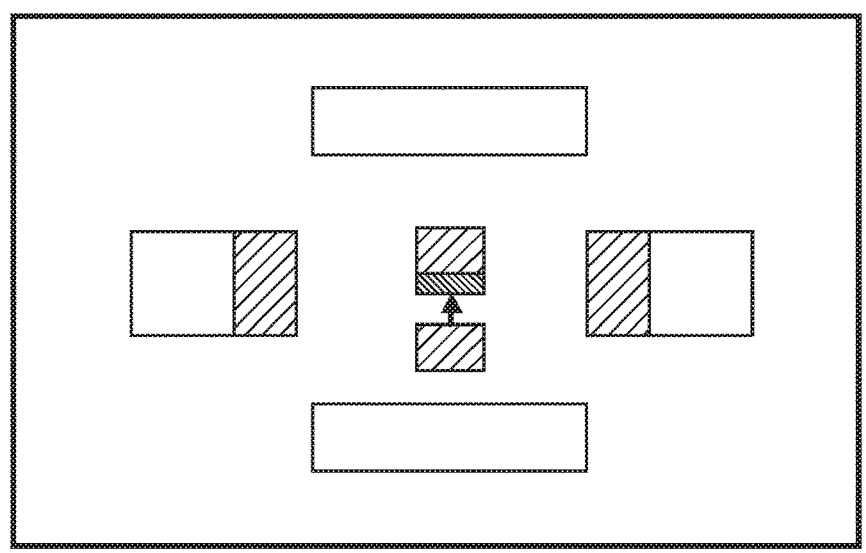
FIG. 14C shows a step in a double-clad laser waveguide fabrication process in accordance with an embodiment.

FIG. 14C illustrates an adhesive free bonding of the bottom inner cladding crystal to the core crystal in order to create a top cladding, core, bottom cladding sandwich.

Figure 14D:
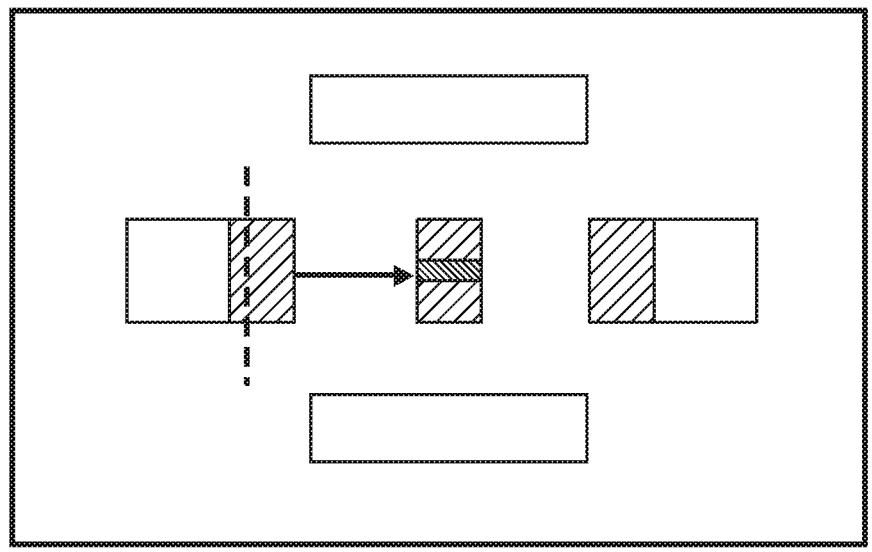
FIG. 14D shows a step in a double-clad laser waveguide fabrication process in accordance with an embodiment.

FIG. 14D illustrates a cutting of the left cladding and then an adhesive free bonding of the cut left cladding to the top cladding, core, bottom cladding sandwich.

Figure 14E:
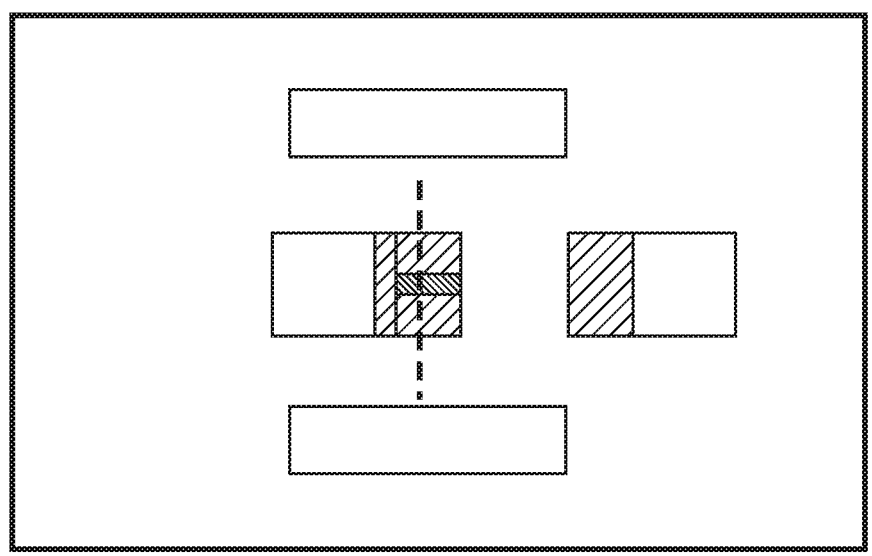
FIG. 14E shows a step in a double-clad laser waveguide fabrication process in accordance with an embodiment.

FIG. 14E illustrates a cutting of the top cladding, core, bottom cladding sandwich.

Figure 14F:
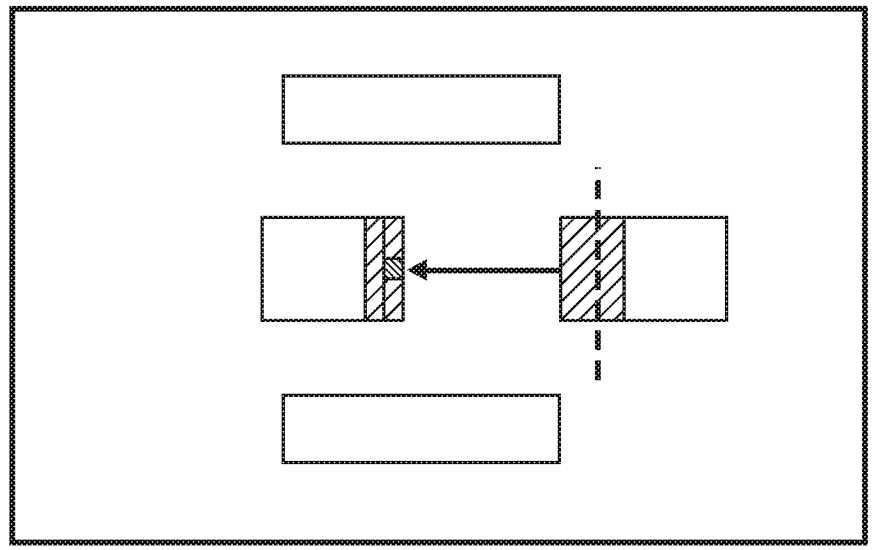
FIG. 14F shows a step in a double-clad laser waveguide fabrication process in accordance with an embodiment.

FIG. 14F illustrates a cutting of the right cladding and then an adhesive free bonding of the cut right cladding to the top cladding, core, bottom cladding sandwich to form a middle portion.

Figure 14G:
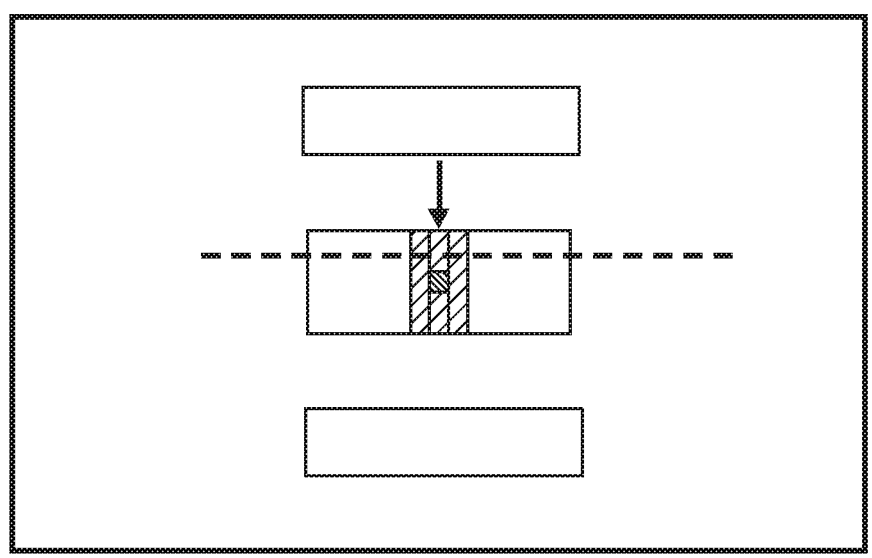
FIG. 14G shows a step in a double-clad laser waveguide fabrication process in accordance with an embodiment.

FIG. 14G illustrates a horizontal cutting of the middle portion and adhesive free bonding of a top outer cladding to the cut middle portion.

Figure 14H:
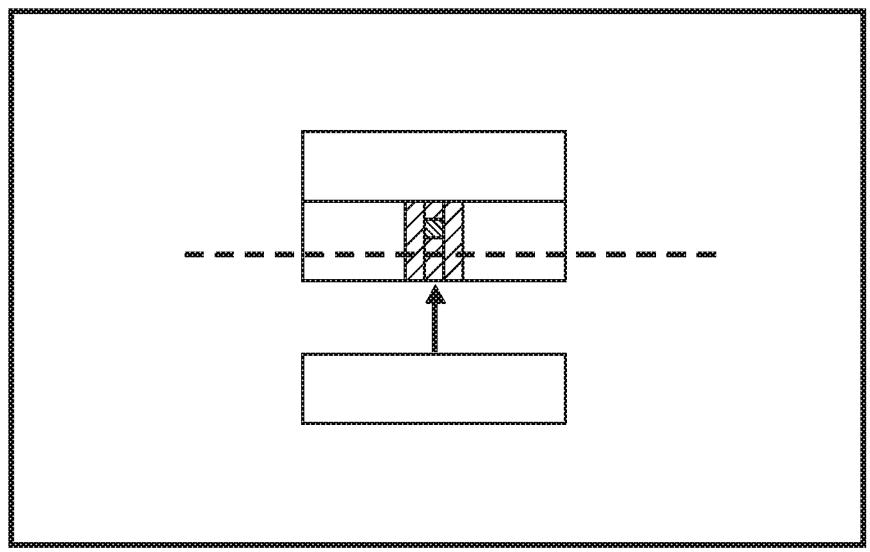
FIG. 14H shows a step in a double-clad laser waveguide fabrication process in accordance with an embodiment.

FIG. 14H illustrates a horizontal cutting of the middle portion and adhesive free bonding of a bottom outer cladding to the cut middle portion.

Figure 14I:
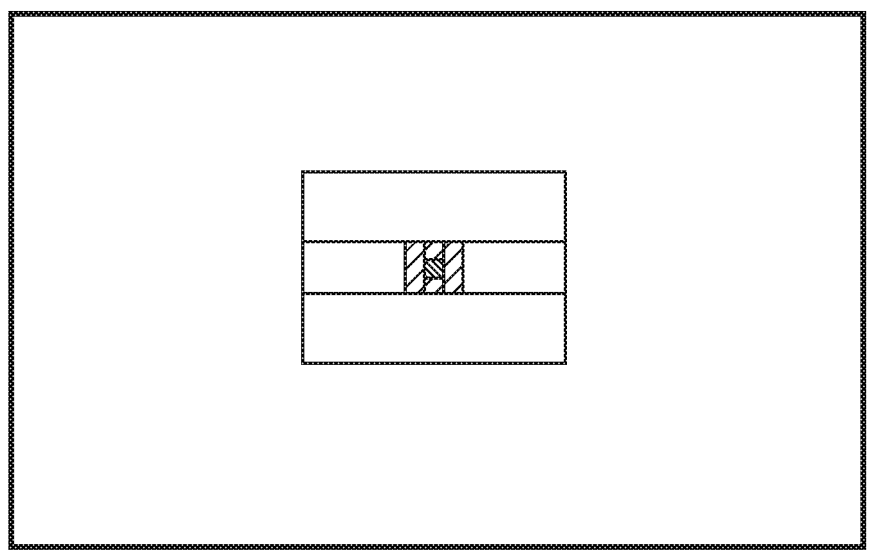
FIG. 14I shows a step in a double-clad laser waveguide fabrication process in accordance with an embodiment.

FIG. 14I illustrates an end view of the final product, like that in FIGS. 5A-5D.

During manufacture, the orientation of the anisotropic laser materials and/or nonlinear optical crystals, can be determined by a D2 CRYSO X-ray Diffraction machine manufactured by Bruker AXS GmbH of Karlsruhe, Germany. The crystals are mounted on a goniometer, and can be tuned with an accuracy of better than 0.1°.

The actual refractive index difference between on-axis and slightly tilted crystals can be measured and confirmed using a VeriFire interferometer manufactured by Zygo Corporation of Middlefield, Conn., U.S.A. For example, at a 1.55 μm operating wavelength, the interferometer can measure refractive index difference to the accuracy of $1 \times 10^{-6}$.

Example 1: LBO Nonlinear Waveguide

An embodiment of the present invention is a lithium triborate $LiB_3O_5$ (LBO) waveguide. LBO is a biaxial optics crystal with a wide transparency range. In the preferred embodiment, a slightly off-axis LBO is used as cladding material to sandwich an on-axis LBO core.

The purpose of the waveguide is to achieve second-harmonic generation from a fundamental beam of 1070 nm to its second harmonic of 535 nm. The fundamental beam is polarized on the z-axis, while the second-harmonic beam is polarized on they-axis. Both beams propagate along the x-axis.

Technical advantages of using LBO include but are not limited to:

1) The refractive index is slightly smaller than the core material, for both fundamental and second harmonic waves;
2) Since they are the same material, the coefficients of thermal expansion are compatible, given that the core and the cladding LBO crystals only have a small angular deviation between them; and
3) The refractive index is continuously tunable by accurately rotating the offset angle on both the y-axis and the z-axis.

The crystal should to be tilted first at an angle θ with respect to the y-axis, and then at an angle φ with respect to the original z-axis, i.e., in the original x-y plane to achieve the required refractive index difference for both the fundamental and second harmonic beams. The wave vector of the two beams can be described by Eq. (6):

$$\vec{k} = \vec{k}_0(\cos\theta\cos\varphi\vec{X} + \cos\theta\sin\varphi\vec{Y} + \sin\theta\vec{Z}) \quad (6)$$

The refractive index for the fundamental beam in the cladding would be the long axis (LA) of the refractive index ellipse, determined by Eq. (7):

$$\begin{cases} X\cos\theta\cos\varphi + Y\cos\theta\sin\varphi + Z\sin\theta = 0 \\ \dfrac{X^2}{(n_X^{1070nm})^2} + \dfrac{Y^2}{(n_Y^{1070nm})^2} + \dfrac{Z^2}{(n_Z^{1070nm})^2} = 1 \end{cases} \quad (7)$$

The refractive index of the fundamental beam $n_f$ is then found in Eq. (8):

$$n_f = LA = \dfrac{1}{\sqrt{\dfrac{\sin^2\theta\cos^2\varphi}{(n_X^{1070nm})^2} + \dfrac{\sin^2\theta\sin^2\varphi}{(n_Y^{1070nm})^2} + \dfrac{\cos^2\varphi}{(n_Z^{1070nm})^2}}} \quad (8)$$

Similarly, the refractive index for the second harmonic beam in the cladding would be the short axis (SA) of the refractive index ellipse, determined by Eq. (9):

$$\begin{cases} X\cos\theta\cos\varphi + Y\cos\theta\sin\varphi + Z\sin\theta = 0 \\ \dfrac{X^2}{(n_X^{535nm})^2} + \dfrac{Y^2}{(n_Y^{535nm})^2} + \dfrac{Z^2}{(n_Z^{535nm})^2} = 1 \end{cases} \quad (9)$$

And the refractive index of second harmonic beam $n_s$ is found in Eq. (10):

$$n_s = SA = \dfrac{1}{\sqrt{\dfrac{\sin^2\varphi}{(n_X^{535nm})^2} + \dfrac{\cos^2\varphi}{(n_Y^{535nm})^2}}} \quad (10)$$

Given $n_X^{1070\,nm}=1.565$, $n_Y^{1070\,nm}=1.591$, $n_Z^{1070\,nm}=1.605$, $n_X^{535\,nm}=1.578$, $n_Y^{535\,nm}=1.606$, we calculate the refractive index difference for both fundamental and second harmonic beam for off-axis angle θ, φ<1°, and obtain the following table. For a core width of 50 μm, single-mode output would require an index difference less than $2.24 \times 10^{-6}$. The index difference is small enough to support a good beam quality in the waveguide if the azimuth angle deviation is less than 0.5°.

A table below lists the refractive index difference when tilting the crystal by θ and φ:

| θ (°) | φ (°) | Δ(Fund. Index) (×10⁻⁴) | Δ(SH. Index) (×10⁻⁵) |
|---|---|---|---|
| 0 | 0.0 | 0 | 0 |
|   | 0.1 | 0 | −0.0088 |
|   | 0.2 | 0 | −0.035 |
|   | 0.3 | 0 | −0.0788 |
|   | 0.4 | 0 | −0.1401 |
|   | 0.5 | 0 | −0.2189 |
|   | 0.6 | 0 | −0.3153 |
|   | 0.7 | 0 | −0.4291 |
|   | 0.8 | 0 | −0.5604 |
|   | 0.9 | 0 | −0.7093 |
|   | 1.0 | 0 | −0.8757 |
| 0.1 | 0.0 | −0.0013 | 0 |
|   | 0.1 | −0.0013 | −0.0088 |
|   | 0.2 | −0.0013 | −0.035 |
|   | 0.3 | −0.0013 | −0.0788 |
|   | 0.4 | −0.0013 | −0.1401 |
|   | 0.5 | −0.0013 | −0.2189 |
|   | 0.6 | −0.0013 | −0.3153 |
|   | 0.7 | −0.0013 | −0.4291 |
|   | 0.8 | −0.0013 | −0.5604 |
|   | 0.9 | −0.0013 | −0.7093 |
|   | 1.0 | −0.0013 | −0.8757 |
| 0.2 | 0.0 | −0.0051 | 0 |
|   | 0.1 | −0.0051 | −0.0088 |
|   | 0.2 | −0.0051 | −0.035 |
|   | 0.3 | −0.0051 | −0.0788 |
|   | 0.4 | −0.0051 | −0.1401 |
|   | 0.5 | −0.0051 | −0.2189 |
|   | 0.6 | −0.0051 | −0.3153 |
|   | 0.7 | −0.0051 | −0.4291 |
|   | 0.8 | −0.0051 | −0.5604 |
|   | 0.9 | −0.0051 | −0.7093 |
|   | 1.0 | −0.0051 | −0.8757 |
| 0.3 | 0.0 | −0.0114 | 0 |
|   | 0.1 | −0.0114 | −0.0088 |
|   | 0.2 | −0.0114 | −0.035 |
|   | 0.3 | −0.0114 | −0.0788 |
|   | 0.4 | −0.0114 | −0.1401 |
|   | 0.5 | −0.0114 | −0.2189 |
|   | 0.6 | −0.0114 | −0.3153 |
|   | 0.7 | −0.0114 | −0.4291 |
|   | 0.8 | −0.0114 | −0.5604 |
|   | 0.9 | −0.0114 | −0.7093 |
|   | 1.0 | −0.0114 | −0.8757 |

-continued

| θ (°) | φ (°) | Δ(Fund. Index) (×10⁻⁴) | Δ(SH. Index) (×10⁻⁵) |
|---|---|---|---|
| 0.4 | 0.0 | −0.0202 | 0 |
| | 0.1 | −0.0202 | −0.0088 |
| | 0.2 | −0.0202 | −0.035 |
| | 0.3 | −0.0202 | −0.0788 |
| | 0.4 | −0.0202 | −0.1401 |
| | 0.5 | −0.0202 | −0.2189 |
| | 0.6 | −0.0202 | −0.3153 |
| | 0.7 | −0.0202 | −0.4291 |
| | 0.8 | −0.0202 | −0.5604 |
| | 0.9 | −0.0202 | −0.7093 |
| | 1.0 | −0.0202 | −0.8757 |
| 0.5 | 0.0 | −0.0316 | 0 |
| | 0.1 | −0.0316 | −0.0088 |
| | 0.2 | −0.0316 | −0.035 |
| | 0.3 | −0.0316 | −0.0788 |
| | 0.4 | −0.0316 | −0.1401 |
| | 0.5 | −0.0316 | −0.2189 |
| | 0.6 | −0.0316 | −0.3153 |
| | 0.7 | −0.0316 | −0.4291 |
| | 0.8 | −0.0316 | −0.5604 |
| | 0.9 | −0.0316 | −0.7093 |
| | 1.0 | −0.0316 | −0.8757 |
| 0.6 | 0.0 | −0.0456 | 0 |
| | 0.1 | −0.0456 | −0.0088 |
| | 0.2 | −0.0456 | −0.035 |
| | 0.3 | −0.0456 | −0.0788 |
| | 0.4 | −0.0456 | −0.1401 |
| | 0.5 | −0.0456 | −0.2189 |
| | 0.6 | −0.0456 | −0.3153 |
| | 0.7 | −0.0456 | −0.4291 |
| | 0.8 | −0.0456 | −0.5604 |
| | 0.9 | −0.0456 | −0.7093 |
| | 1.0 | −0.0456 | −0.8757 |
| 0.7 | 0.0 | −0.062 | 0 |
| | 0.1 | −0.062 | −0.0088 |
| | 0.2 | −0.062 | −0.035 |
| | 0.3 | −0.062 | −0.0788 |
| | 0.4 | −0.062 | −0.1401 |
| | 0.5 | −0.062 | −0.2189 |
| | 0.6 | −0.062 | −0.3153 |
| | 0.7 | −0.062 | −0.4291 |
| | 0.8 | −0.062 | −0.5604 |
| | 0.9 | −0.062 | −0.7093 |
| | 1.0 | −0.062 | −0.8757 |
| 0.8 | 0.0 | −0.081 | 0 |
| | 0.1 | −0.081 | −0.0088 |
| | 0.2 | −0.081 | −0.035 |
| | 0.3 | −0.081 | −0.0788 |
| | 0.4 | −0.081 | −0.1401 |
| | 0.5 | −0.081 | −0.2189 |
| | 0.6 | −0.081 | −0.3153 |
| | 0.7 | −0.081 | −0.4291 |
| | 0.8 | −0.081 | −0.5604 |
| | 0.9 | −0.081 | −0.7093 |
| | 1.0 | −0.081 | −0.8757 |
| 0.9 | 0.0 | −0.1025 | 0 |
| | 0.1 | −0.1025 | −0.0088 |
| | 0.2 | −0.1025 | −0.035 |
| | 0.3 | −0.1025 | −0.0788 |
| | 0.4 | −0.1025 | −0.1401 |
| | 0.5 | −0.1025 | −0.2189 |
| | 0.6 | −0.1025 | −0.3153 |
| | 0.7 | −0.1025 | −0.4291 |
| | 0.8 | −0.1025 | −0.5604 |
| | 0.9 | −0.1025 | −0.7093 |
| | 1.0 | −0.1025 | −0.8757 |

At such a small off-axis angle for the cladding material, the coefficient of thermal expansion (CTE) along the three axes will be minimally affected. The CTE change percentage, as influenced by the deviation angle, is derived as in Eq. (11):

$$\begin{cases} \alpha'_x = \alpha_x\cos\theta\cos\varphi - \alpha_y\sin\varphi - \alpha_z\sin\theta\cos\varphi \\ \alpha'_y = \alpha_x\cos\theta\sin\varphi + \alpha_y\cos\varphi - \alpha_z\sin\theta\sin\varphi \\ \alpha'_z = \alpha_x\sin\theta + \alpha_z\cos\theta \end{cases} \quad (11)$$

As a numerical example, at θ, φ=0.5°, the difference of CTE at dielectric X,Y,Z directions will be 0.33%, −1.1%, 2.12% respectively.

To conclude, LBO with a slightly off-axis tilt angle is a good candidate as cladding material for LBO oriented along the x-axis. This method can be applied to fabricate waveguides for other biaxial crystals, such as KTP, BiBO, RTA, $KNbO_3$, etc.

Example 2: $LiNbO_3$ Nonlinear Waveguide

An embodiment of the present disclosure includes a planar, periodically poled waveguide (such as that in FIGS. 6A-6C) with a lateral core width d=40 μm. The core material is slightly tilted periodically poled lithium niobate, while the cladding material is bulk, un-tilted lithium niobate. The planar waveguide is designed for second harmonic generation from 1.064 μm to 0.532 μm. The poling period is designed to be 6.78 μm in order to fulfill quasi-phase matching condition for the intended second order nonlinear frequency conversion process.

Both 1.064 μm and 0.532 μm beams are polarized along optic axis of lithium niobate. If the shortest wavelength (0.532 μm) is intrinsically single mode in the waveguide, the other longer wavelength(s) will be intrinsically single mode as well. Therefore, the waveguide should be designed such that it can support only the fundamental mode of the 0.532 μm beam.

Eq. (2) gives the criteria for designing intrinsically single-mode planar waveguides. The refractive index difference between the core and the cladding cannot exceed $(\Delta n)_{max}=9.89\times 10^{-6}$. Since the polarization of both beams is along the optic axis, a 0.532 μm beam will experience refractive $n_e$ in the cladding. The core is tilted to have a slightly higher refractive index, which is limited by $(\Delta n)_{max}$. The maximum tilting angle calculated by Eq. (5) is 0.62 degrees. The maximum tilting angle is preferred because it provides the maximum refractive index contrast allowable and consequently the optimal confinement of an electric field in the core region.

Example 3: Yb:YLF Laser Waveguide

Consider a 40 μm thick planar laser waveguide employing Yb:YLF as core material, such as that in FIGS. 4A-4E, for the purpose of emitting at 1030 nm.

YLF is positive uniaxial crystal whose extraordinary refractive index $n_e$=1.4704 and ordinary refractive index $n_o$=1.4482. For Yb:YLF laser, the emission line at 995 nm is polarized along the c-axis (extraordinary). Therefore, the inner cladding should be slightly tilted (see FIG. 4E) such that a single-mode waveguide along the lateral direction can be formed. According to Eq. (2), the index difference is calculated to be $\Delta n=5.89\times 10^{-5}$. According to Eq. (5), tilt angle θ<0.051°. If single-mode operation is not a requirement, the tilting angle can be larger.

Example 4: $Nd:YVO_4$ Laser Waveguide

A $Nd:YVO_4$ waveguide is formed using a higher concentration $Nd:YVO_4$ material as the core and lower concentration Nd:YVO$_4$ material as the inner cladding. The refractive index difference needed to form a single-mode or multimode waveguide is provided by different Nd$^{3+}$ doping levels in the vanadate host. The higher the doping level, the higher the refractive index.

Example 5: Inactive Waveguide Capped Yb:YLF Laser Waveguide

Consider an active gain medium of Yb:YLF, the same type as in Example 4. On the two ends, a short Nd:YLF waveguide, whose length is in the order of ~5 mm, is bonded to the Yb:YLF waveguide. The absorption peak for Nd:YLF is at 808 nm, while the absorption peak for Yb:YLF is at 960 nm. When pumped at 960 nm, the two short Nd:YLF waveguides will not lase. The mode profile of the Nd:YLF waveguide is designed in such a way that it matches the mode profile of the Yb:YLF to the best extent by slightly tilting the inner cladding Nd:YLF, as described before, such that the laser radiation can propagate in the entire waveguide structure with minimal loss.

Technical advantages of such a capped laser waveguide design include: 1) protecting the optical coating; and 2) mitigating thermal-induced fracture, by moving the focus point of pump beam to the inactive end rather than directly focusing on the active gain medium.

Other Notes

A difference in refractive index for anisotropic laser crystals also is obtainable at a propagation direction that is not along a crystal axis and a small deviation from it, but also at an arbitrary orientation between the propagation direction and the crystal axis. As example, there may be a benefit to lasing behavior to propagate at an angle of e.g., 5-15 degrees off the c-axis of rare earth doped YLF. The same rules for selecting an index difference apply to this situation.

In general, using differential doping of the core and the cladding can be applied to anisotropic crystals, but it is most applicable to laser crystals. Some nonlinear crystals also are co-doped or can be co-doped (e.g., H$^+$ can be exchanged with Li$^+$ in LiNbO$_3$ or He$^+$ can be implanted into KTP) to change the refractive index. There is, however, a possible issue that doping a non-linear crystal could change the nonlinear coefficient of the material.

If categorized by crystal structure types, "cubic" is "isotropic"; "trigonal," "tetragonal," and "hexagonal" belong to the "uniaxial, anisotropic" group, and "triclinic," "monoclinic," and "orthogonal" belong to "biaxial, anisotropic" crystals.

Conclusion

In conclusion it can be seen that embodiments of the invention can provide the ability to design waveguide structures in anisotropic lasing and nonlinear optical media with desired properties such as intrinsic single-mode operation. Precise control over the index difference provides design flexibility. The invention offers a new way to make nonlinear optical crystal waveguides of specific orientations for specific harmonic conversions.

A further understanding of the nature and advantages of the present invention may be realized by reference to the remaining portions of the specification and the drawings.

What is claimed is:

1. A single-mode waveguide apparatus comprising:
an anisotropic core crystal having a core optical axis, at least two flat surfaces opposite one another, a thickness d between the at least two flat surfaces, and a light beam propagation axis that is parallel to two of the at least two flat surfaces; and
a pair of anisotropic cladding crystals having flat surfaces that are intimately joined with two of the at least two flat surfaces of the core crystal and sandwiching the core crystal, the cladding crystals having a cladding optical axis, the cladding optical axis and the core optical axis being rotated with respect to each other in a direction of, or direction opposite to, the light beam propagation axis, the anisotropic core crystal and anisotropic cladding crystals being comprised of a same material,
wherein the core optical axis and the cladding optical axis are aligned such that:

$$\frac{2d}{\lambda}\sqrt{n_{core}^2 - n_{clad}^2} \leq 1.37$$

where
$n_{core}$ is a refractive index of the core crystal for a light beam with wavelength $\lambda$ propagating parallel to the light beam propagation axis;
$n_{clad}$ is a refractive index of the cladding crystals for the light beam with wavelength $\lambda$ propagating parallel to the light beam propagation axis.

2. The apparatus of claim 1 wherein the core crystal has a square cross section and the at least two flat surfaces include four flat surfaces, the apparatus further comprising:
a second pair of anisotropic cladding crystals having flat surfaces that are intimately joined with a remaining two of the four flat surfaces.

3. The apparatus of claim 1 wherein the core crystal is planar and the core optical axis and the cladding optical axis are aligned such that:

$$\frac{2d}{\lambda}\sqrt{n_{core}^2 - n_{clad}^2} \leq 1.$$

4. The apparatus of claim 1 wherein the wavelength $\lambda$ is within a visible light wavelength between 390 nanometers (nm) and 700 nm.

5. The apparatus of claim 1 wherein the wavelength $\lambda$ is within an infrared wavelength between 700 nanometers (nm) and 1 millimeter (mm).

6. The apparatus of claim 1 wherein:
the material of the anisotropic core crystal and cladding crystal is a positive uniaxial nonlinear crystal material consisting essentially of:
ZGP (ZnGeP$_2$).

7. The apparatus of claim 1 wherein:
the material of the anisotropic core crystal and cladding crystal is a negative uniaxial nonlinear crystal material selected from the group consisting essentially of:
β BaB$_2$O$_4$,
CsLiB$_6$O$_{10}$,
LiNbO$_3$,
MgO:LiNbO$_3$,
AgGaS$_2$, or
AgGaSe$_2$.

8. The apparatus of claim 1 wherein:
the material of the anisotropic core crystal and cladding crystal is a biaxial nonlinear crystal material selected from the group consisting essentially of:

KTP (KTiPO$_4$),
LiB$_3$O$_5$,
KNbO$_3$,
CsB$_3$O$_5$,
BiB$_3$O$_6$,
CsTiAsO$_4$, and
RbTiOAsO$_4$.

9. The apparatus of claim 1 wherein the core crystal and cladding crystals are joined without adhesive.

10. The apparatus of claim 1 wherein a cross section of the core crystal and cross sections of the cladding crystals are constant throughout the waveguide apparatus.

11. The apparatus of claim 1 wherein a cross section of the core crystal is wedged along the light beam propagation axis.

12. The apparatus of claim 1 further comprising:
an outer cladding joined with the cladding crystals.

13. A laser apparatus comprising:
the waveguide apparatus of claim 1; and
a pump laser.

14. A method of manufacturing a single-mode waveguide, the method comprising:
providing a first anisotropic crystal with a flat surface;
polishing the flat surface;
measuring, using X-rays, a first angle of the flat surface with respect to an optical axis of the first crystal;
determining a refractive index n$_1$ of the first crystal for a light beam with wavelength λ propagating in a direction parallel to the flat surface;
gauging, using X-rays, an optical axis orientation of a second anisotropic crystal, the first and second crystals being comprised of a same anisotropic material;
calculating a second angle with respect to the optical axis orientation of the second crystal such that a refractive index n$_2$ of the second crystal for a light beam with wavelength λ propagating parallel to the second angle is such that:

$$\frac{2d}{\lambda}\sqrt{n_1^2 - n_2^2} \leq 1.37$$

where d is a nominal lateral core width for the waveguide;
cutting and polishing the second anisotropic crystal to form a flat surface on the second anisotropic crystal at the second angle to the optical axis of the second anisotropic crystal; and
joining the flat surfaces of the first and second crystals together.

15. The method of claim 14 wherein the joining of the flat surfaces is achieved without adhesive between the first and second anisotropic crystals.

16. The method of claim 14 further comprising:
cutting the first anisotropic crystal from a single crystal boule, wherein the cutting of the second anisotropic crystal is from the single crystal boule.

17. The apparatus of claim 1 wherein:
the core optical axis is perpendicular to the light beam propagation axis; and
the cladding optical axis is tilted with respect to the light beam propagation axis.

18. The apparatus of claim 1 wherein:
the core optical axis is tilted with respect to the light beam propagation axis; and
the cladding optical axis is perpendicular with respect to the light beam propagation axis.

* * * * *